(12) United States Patent
Yamauchi et al.

(10) Patent No.: US 11,163,119 B2
(45) Date of Patent: Nov. 2, 2021

(54) WAVELENGTH CONVERSION DEVICE AND METHOD OF PERFORMING WAVELENGTH CONVERSION

(71) Applicant: FUJITSU LIMITED, Kawasaki (JP)

(72) Inventors: Tomohiro Yamauchi, Kawasaki (JP); Tomoyuki Kato, Yokohama (JP); Goji Nakagawa, Sagamihara (JP); Takeshi Hoshida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/884,909

(22) Filed: May 27, 2020

(65) Prior Publication Data

US 2020/0379180 A1    Dec. 3, 2020

(30) Foreign Application Priority Data

Jun. 3, 2019   (JP) .............................. JP2019-103788

(51) Int. Cl.
   *G02B 6/28*     (2006.01)
   *G02B 6/293*    (2006.01)
   *G02B 6/12*     (2006.01)

(52) U.S. Cl.
   CPC ..... *G02B 6/29302* (2013.01); *G02B 6/12007* (2013.01); *G02B 6/2938* (2013.01); *G02B 6/29394* (2013.01)

(58) Field of Classification Search
   CPC .............. G02B 6/29394; G02B 6/2938; G02B 6/12007; H04J 14/06; H04J 14/0256; G02F 1/365
   See application file for complete search history.

(56) References Cited

U.S. PATENT DOCUMENTS

| 2008/0166128 | A1* | 7/2008  | Toyomaki  | H04J 14/06 398/79 |
| 2017/0104535 | A1  | 4/2017  | Hoshida   |           |
| 2018/0316422 | A1* | 11/2018 | Kato      | H04B 10/0771 |
| 2019/0353980 | A1* | 11/2019 | Shukunami | G02F 1/3536 |
| 2020/0059313 | A1* | 2/2020  | Kato      | H04B 10/25891 |

FOREIGN PATENT DOCUMENTS

| JP | H06-013988 A | 1/1994 |
| JP | 2017-073729 A | 4/2017 |

* cited by examiner

*Primary Examiner* — Ellen E Kim
(74) *Attorney, Agent, or Firm* — Fujitsu Patent Center

(57) ABSTRACT

A method includes multiplexing signal light of first polarization and excitation light, and multiplexing signal light of second polarization, which is perpendicular to the first polarization, and the excitation light, modulating the signal light of the first polarization before the wavelength conversion, and reducing a modulation component in signal light after wavelength conversion, modulating the signal light of the second polarization before the wavelength conversion, and reducing the modulation component in the signal light after the wavelength conversion, and multiplexing the signal light of the first polarization after the wavelength conversion and the signal light of the second polarization after the wavelength conversion.

12 Claims, 24 Drawing Sheets

WAVELENGTH CONVERSION DEVICE AND METHOD OF PERFORMING WAVELENGTH CONVERSION

CROSS-REFERENCE TO RELATED APPLICATION

This application is based upon and claims the benefit of priority of the prior Japanese Patent Application No. 2019-103788, filed on Jun. 3, 2019, the entire contents of which are incorporated herein by reference.

FIELD

The embodiments discussed herein are related to a wavelength conversion device and a method of performing wavelength conversion.

BACKGROUND

As demand for communication increases, for increasing transmission capacity, for example, the number of cores of optical fibers, capacity of optical signals per wavelength, and the number of wavelength division multiplexing (WDM) channels are increased.

However, since the cost of, for example, laying optical fibers is high, it is desired to increase the transmission capacity without increasing the number of optical fiber cores. It is desired that a transmission device has a transmission capacity increased by increasing the optical signal capacity and the number of WDM channels. However, there is a limitation on the increase in transmission capacity with only the existing communication band, for example, the conventional band (C-band). Accordingly, in order to further increase the transmission capacity, it is desired to use not only the C-band but also the long band (L-band) in the long wavelength region and the short band (S-band) in the short wavelength region.

However, it is desired that optical components such as an optical transceiver, a wavelength multiplexer/demultiplexer, and an optical amplifier for, for example, the L-band and S-band be independently developed. Thus, the cost of the transmission device using optical components for the L-band and S-band is high compared to the cost of the transmission device only using optical components for the C-band. By using the wavelength conversion device, high capacity transmission may be performed with a transmission device using C-band optical components.

Meanwhile, in the wavelength conversion device, it is important to increase wavelength conversion efficiency. However, for increasing the wavelength conversion efficiency, it is desired to increase the power of excitation light. When high-intensity monochromatic excitation light is input to an optical fiber, stimulated Brillouin scattering (SBS) occurs in which input light is scattered backward and does not propagate. In particular, when a fiber having a small core diameter referred to as a highly nonlinear fiber is used, the likelihood of the occurrences of SBS increases.

Thus, according to the related art, the spectral width of excitation light is increased by performing modulation of about some hundred MHz to some GHz on monochromatic excitation light to suppress SBS. As a result, high-power excitation light may be input to the optical fiber. Thus, high wavelength conversion efficiency may be reliably obtained.

Accordingly, in the wavelength conversion device, modulation is performed on signal light and excitation light before wavelength conversion, and a modulation component of the modulated signal light and a modulation component of the modulated excitation light are canceled out each other, thereby a modulation component in the signal light after the wavelength conversion is reduced. This may suppress degradation in signal characteristic after the wavelength conversion.

Related art is disclosed in, for example, Japanese Laid-open Patent Publication Nos. 2017-73729 and 6-13988.

SUMMARY

According to an aspect of the embodiments, an apparatus includes a method includes multiplexing signal light of first polarization and excitation light, and multiplexing signal light of second polarization, which is perpendicular to the first polarization, and the excitation light, modulating the signal light of the first polarization before the wavelength conversion, and reducing a modulation component in signal light after wavelength conversion, modulating the signal light of the second polarization before the wavelength conversion, and reducing the modulation component in the signal light after the wavelength conversion, and multiplexing the signal light of the first polarization after the wavelength conversion and the signal light of the second polarization after the wavelength conversion.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In a wavelength conversion device, signal light of a single polarization and excitation light are modulated, and a modulation component of the signal light after the modulation is canceled out with a modulation component after the modulation, thereby the modulation component of the signal light after wavelength conversion is reduced. However, the wavelength conversion device does not address polarization multiplexed signal light obtained by multiplexing X-polarized signal light and Y-polarized signal light, and accordingly, deterioration of the signal characteristics of the polarization multiplexed signal light after wavelength conversion is not suppressed.

According to an aspect, it is an object to provide a wavelength conversion device or the like with which stable polarization multiplexed signal light may be obtained.

According to one embodiment of the present application, stable polarization multiplexed signal light may be obtained.

Embodiments of a wavelength conversion device and so forth disclosed herein will be described in detail below with reference to the drawings. Each of the embodiments does not limit the disclosed technique. The embodiments described below may be appropriately combined as long as combined embodiments are consistent with each other.

First Embodiment

Figure 1:
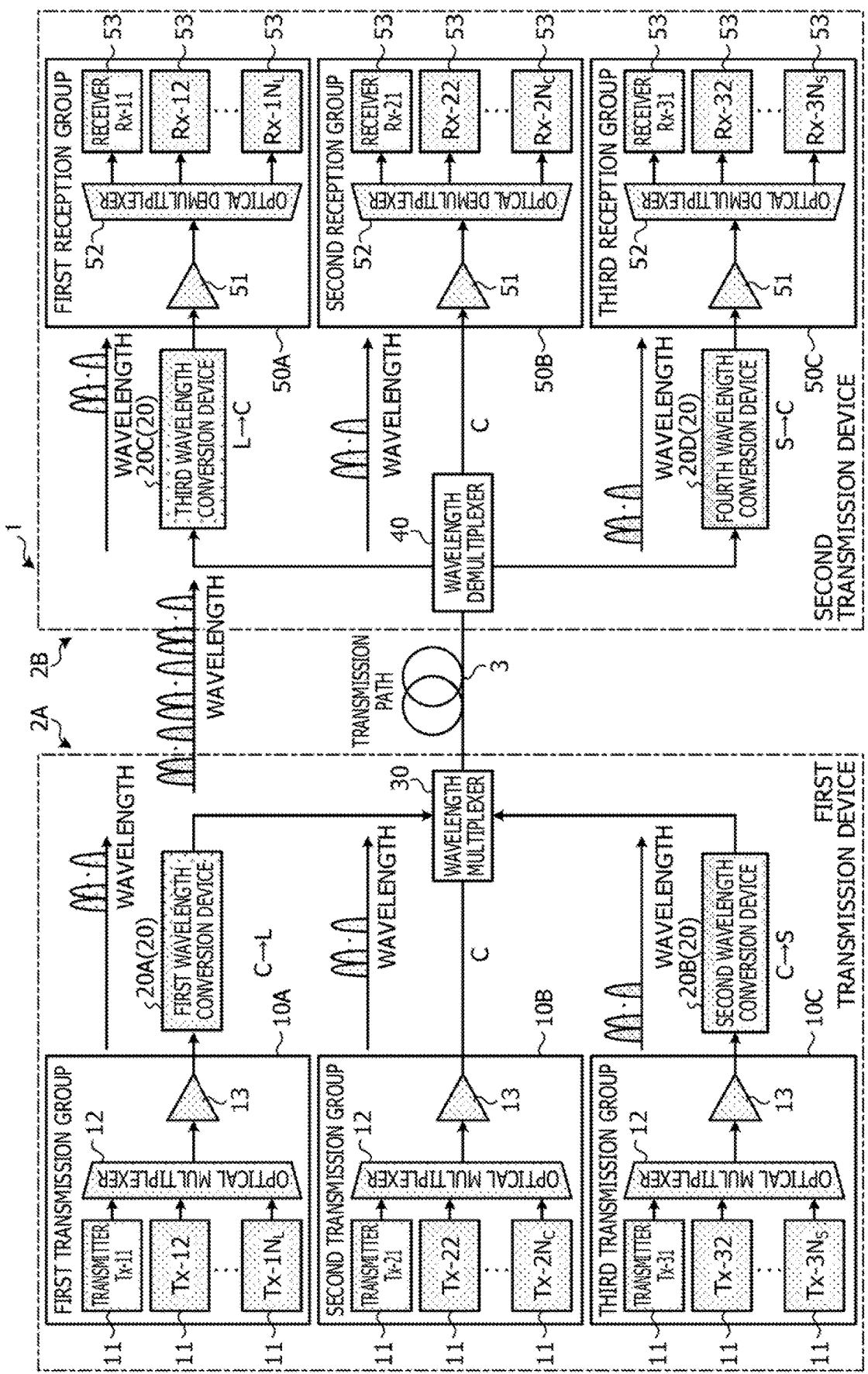
FIG. 1 is an explanatory view illustrating an example of a wavelength division multiplexing (WDM) system according to embodiments herein.

FIG. 1 is an explanatory view illustrating an example of a wavelength division multiplexing (WDM) system 1 according to a first embodiment. The WDM system 1 illustrated in FIG. 1 includes a first transmission device 2A, a second transmission device 2B, and a transmission path 3 such as an optical fiber that couples the first transmission device 2A and the second transmission device 2B to each other. The WDM system 1 is a multiband system that transmits multiplexed light of different spectrum bands such as, for example, the conventional band (C-band), the long wavelength band (L-band), and the short wavelength band (S-band).

The first transmission device 2A includes a first transmission group 10A, a second transmission group 10B, a third transmission group 10C, a first wavelength conversion device 20A (20), a second wavelength conversion device 20B (20), and a wavelength multiplexer 30. The first transmission group 10A includes a plurality of C-band transmitters 11, an optical multiplexer 12, and an optical amplifier 13. The transmitters 11 output signal light of different C-band wavelengths to the optical multiplexer 12. The optical multiplexer 12 multiplexes the signal light from the transmitters 11 and outputs first multiplexed light of the C-band to the optical amplifier 13. The optical amplifier 13 is, for example, an erbium doped optical fiber amplifier (EDFA). The optical amplifier 13 optically amplifies the first multiplexed light and outputs to the first wavelength conversion device 20A the first multiplexed light of the C-band after optical amplification.

The second transmission group 10B includes a plurality of C-band transmitters 11, an optical multiplexer 12, and an optical amplifier 13. The transmitters 11 output signal light of different C-band wavelengths to the optical multiplexer 12. The optical multiplexer 12 multiplexes the signal light from the transmitters 11 and outputs first multiplexed light of the C-band to the optical amplifier 13. The optical amplifier 13 optically amplifies the first multiplexed light and outputs to the wavelength multiplexer 30 the first multiplexed light of the C-band after optical amplification.

The third transmission group 10C includes a plurality of C-band transmitters 11, an optical multiplexer 12, and an optical amplifier 13. The transmitters 11 output signal light of different C-band wavelengths to the optical multiplexer 12. The optical multiplexer 12 multiplexes the signal light from the transmitters 11 and outputs first multiplexed light of the C-band to the optical amplifier 13. The optical amplifier 13 optically amplifies the first multiplexed light and outputs to the second wavelength conversion device 20B the first multiplexed light of the C-band after amplification. The first transmission group 10A, the second transmission group 10B, and the third transmission group 10C include the optical amplifiers 13 therein. However, the first transmission group 10A, the second transmission group 10B, or the third transmission group 10C do not necessarily include the optical amplifiers 13 when the first multiplexed light from the optical multiplexers 12 is able to obtain sufficient power. The settings regarding this may be appropriately changed.

The first wavelength conversion device 20A is a wavelength converter that employs a degenerate four-wave mixing method to perform wavelength conversion on the first multiplexed light of the C-band from the first transmission group 10A to obtain, by using excitation light, second multiplexed light of the L-band. The first wavelength conversion device 20A outputs to the wavelength multiplexer 30 the second multiplexed light of the L-band after the wavelength conversion.

The second wavelength conversion device 20B is a wavelength converter that employs the degenerate four-wave mixing method to perform wavelength conversion on the first multiplexed light of the C-band from the third transmission group 10C to obtain, by using excitation light, third multiplexed light of the S-band. The second wavelength conversion device 20B outputs to the wavelength multiplexer 30 the third multiplexed light of the S-band after the wavelength conversion.

The wavelength multiplexer 30 multiplexes the first multiplexed light of the C-band from the second transmission group 10B, the second multiplexed light of the L-band from the first wavelength conversion device 20A, and the third multiplexed light of the S-band from the second wavelength conversion device 20B and outputs the first to third multiplexed light to the transmission path 3.

The second transmission device 2B includes a wavelength demultiplexer 40, a third wavelength conversion device 20C (20), a fourth wavelength conversion device 20D (20), a first reception group 50A, a second reception group 50B, and a third reception group 50C. The wavelength demultiplexer 40 demultiplexes the multiplexed light received through the transmission path 3 into the first multiplexed light of the C-band, the second multiplexed light of the L-band, and the third multiplexed light of the S-band. The wavelength demultiplexer 40 outputs the first multiplexed light to the second reception group 50B, the second multiplexed light to the third wavelength conversion device 20C, and the third multiplexed light to the fourth wavelength conversion device 20D.

The second reception group 50B includes an optical amplifier 51, an optical demultiplexer 52, and a plurality of receivers 53. The optical amplifier 51 optically amplifies the first multiplexed light of the C-band from the wavelength demultiplexer 40 and outputs to the optical demultiplexer 52 the first multiplexed light after optical amplification. The optical amplifier 51 is, for example, an EDFA. The optical demultiplexer 52 demultiplexes the first multiplexed light into beams of signal light of the C-band of respective wavelengths and outputs the beams of signal light to each of the receivers 53.

The third wavelength conversion device 20C performs wavelength conversion on, by using excitation light, the second multiplexed light of the L-band from the wavelength demultiplexer 40 to obtain the first multiplexed light of the C-band and outputs to the first reception group 50A the first multiplexed light of the C-band after the wavelength conversion. The first reception group 50A includes an optical amplifier 51, an optical demultiplexer 52, and a plurality of receivers 53. The optical amplifier 51 optically amplifies the first multiplexed light of the C-band from the third wavelength conversion device 20C after the wavelength conversion and outputs to the optical demultiplexer 52 the first multiplexed light after the optical amplification. The optical demultiplexer 52 demultiplexes the first multiplexed light into beams of signal light of the C-band of respective wavelengths and outputs the beams of signal light to each of the receivers 53. Each of the transmitters 11 of the first transmission group 10A communicates with one of the receivers 53 corresponding to the transmitter 11 out of the plurality of receivers 53 of the first reception group 50A at an arbitrary wavelength of the C-band. For example, one of the transmitters 11, Tx-11, of the first transmission group 10A and one of the receivers 53, Rx-12, of the first reception group 50A use signal light of the same wavelength C1, and the transmitter 11, Tx-11, transmits the signal light at the same wavelength C1 as that of the receiver 53 of Rx-12. Likewise, the transmitters 11 of the second transmission group 10B also communicates with one of the receivers 53 corresponding to the transmitter 11 out of the plurality of receivers 53 of the second reception group 50B at an arbitrary wavelength of the C-band. For example, each of the transmitters 11 and a corresponding one of the receivers 53 form a communication pair using the same wavelength.

The fourth wavelength conversion device 20D performs wavelength conversion on, by using excitation light, the third multiplexed light of the S-band from the wavelength demultiplexer 40 to obtain the first multiplexed light of the C-band and outputs to the third reception group 50C the first multiplexed light of the C-band after the wavelength conversion. The third reception group 50C includes an optical amplifier 51, an optical demultiplexer 52, and a plurality of receivers 53. The optical amplifier 51 optically amplifies the first multiplexed light of the C-band from the fourth wavelength conversion device 20D after the wavelength conversion and outputs to the optical demultiplexer 52 the first multiplexed light after the optical amplification. The optical demultiplexer 52 demultiplexes the first multiplexed light into beams of signal light of the C-band of respective wavelengths and outputs the beams of signal light to each of the receivers 53. Each of the transmitters 11 of the third transmission group 10C communicates with one of the receivers 53 corresponding to the transmitter 11 out of the plurality of receivers 53 of the third reception group 50C at an arbitrary wavelength of the C-band. For example, one of the transmitters 11, Tx-31, of the third transmission group 10C and one of the receivers 53, Rx-31, of the third reception group 50C use signal light of the same wavelength C2, and the transmitter 11, Tx-32, transmits the signal light at the same wavelength C2 as that of the receiver 53 of Rx-32. For example, each of the transmitters 11 and a corresponding one of the receivers 53 form a communication pair using the same wavelength.

Figure 2:
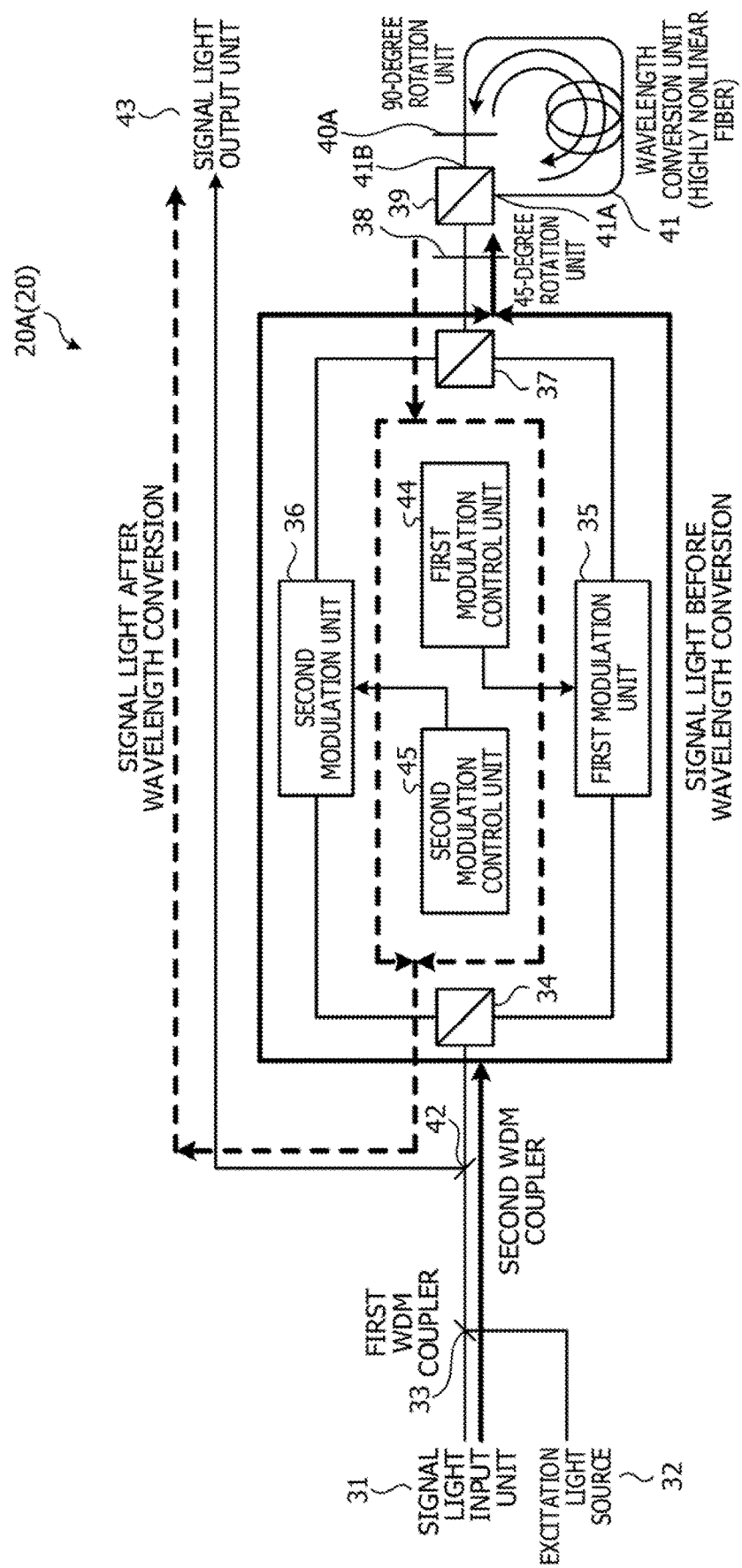
FIG. 2 is an explanatory view illustrating an example of a wavelength conversion device according to a first embodiment.

FIG. 2 is an explanatory view of an example of the wavelength conversion device 20 according to the first embodiment. For convenience of description, for example, the first wavelength conversion device 20A is described as the example for description of the wavelength conversion device 20 illustrated in FIG. 2. The first wavelength conversion device 20A illustrated in FIG. 2 includes a signal light input unit 31, an excitation light source 32, a first WDM coupler 33, a first polarizing beam splitter (PBS) 34, a first modulation unit 35, a second modulation unit 36, and a second PBS 37. The first wavelength conversion device 20A also includes a 45-degree rotation unit 38, a third PBS 39, a 90-degree rotation unit 40A, a wavelength conversion unit 41, a second WDM coupler 42, a signal light output unit 43, a first modulation control unit 44, and a second modulation control unit 45.

The signal light input unit 31 inputs the X-polarized and Y-polarized signal light. The excitation light source 32 emits excitation light of a single polarization, for example, X-polarized excitation light. The first WDM coupler 33 multiplexes the X-polarized and Y-polarized signal light from the signal light input unit 31 and the X-polarized excitation light from the excitation light source 32. The first PBS 34 splits input light from one direction into X polarization and Y polarization and multiplexes X-polarized input light and Y-polarized input light from the other direction. The first modulation unit 35 is a bidirectional phase modulator that performs frequency modulation on X-polarized input light from one direction and performs frequency modulation on X-polarized input light from the other direction (port on the wavelength conversion unit 41 side). The first modulation unit 35 performs the frequency modulation on the X-polarized input light from the other direction so as to minimize a modulation component generated by modulating the X-polarized input light from the one direction. The second modulation unit 36 performs frequency modulation on Y-polarized input light from one direction and performs frequency modulation on Y-polarized input light from the other direction (port on the wavelength conversion unit 41 side). The second modulation unit 36 performs the frequency modulation on the Y-polarized input light from the other direction so as to minimize a modulation component generated by modulating the Y-polarized input light from the one direction.

The second PBS 37 multiplexes X-polarized input light and Y-polarized input light from one direction and splits input light from the other direction into X polarization and Y polarization. The 45-degree rotation unit 38 rotates input light from one direction by 45 degrees and rotates input light from the other direction by 45 degrees. The third PBS 39 splits input light from one direction into X polarization and Y polarization and multiplexes X-polarized input light and Y-polarized input light from the other direction. The third PBS 39 includes an X port 41A and a Y port 418 in the other direction and inputs X-polarized input light to the X port 41A and Y-polarized input light to the Y port 41B. The 90-degree rotation unit 40A rotates input light from one direction by 90 degrees and rotates input light from the other direction by 90 degrees. Signal light and excitation light in input light from one direction (X port 41A) propagate through the wavelength conversion unit 41 and undergo wavelength conversion into signal light of a different wavelength in accordance with the excitation light. Signal light and excitation light in input light from the other direction (Y port 41B) propagate through the wavelength conversion unit 41 and undergo wavelength conversion into signal light of a different wavelength in accordance with the excitation lit. The wavelength conversion unit 41 includes, for example, a highly nonlinear fiber (HNLF) or the like through which light propagates bidirectionally. The second WDM coupler 42 outputs to the signal light output unit 43 the signal light after the wavelength conversion from the input light. The first modulation control unit 44 controls the first modulation unit 35. The second modulation control unit 45 controls the second modulation unit 36.

A first optical path length by which the X-polarized signal light after the wavelength conversion returns from the port on the wavelength conversion unit 41 side disposed in the first modulation unit 35 is set to a distance corresponding to a wavelength half a wavelength shifted from an integral multiple of the wavelength of the X-polarized signal light after modulation. A second optical path length by which the Y-polarized signal light after the wavelength conversion returns from the port on the wavelength conversion unit 41 side disposed in the second modulation unit 36 is set to a distance corresponding to a wavelength half a wavelength shifted from an integral multiple of the wavelength of the Y-polarized signal light after modulation.

Figure 3:
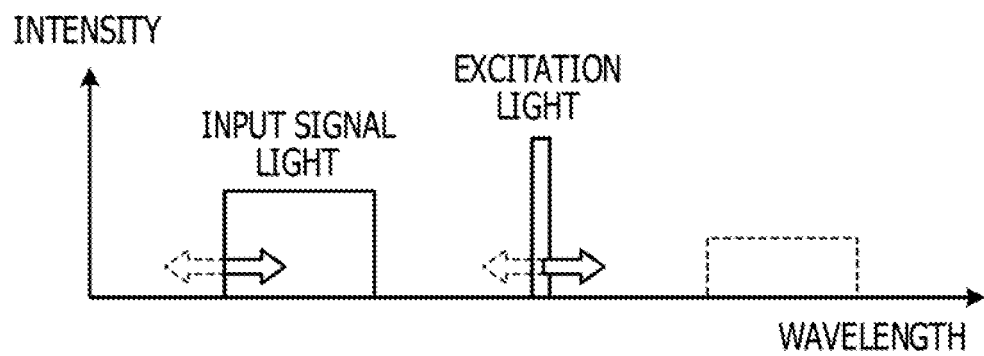
FIG. 3 is an explanatory view illustrating examples of the relationship between signal light after modulation and before wavelength conversion and excitation light that after the modulation and before the wavelength conversion.

FIG. 3 is an explanatory view illustrating examples of the relationship between the signal light after the modulation and before the wavelength conversion and the excitation light after the modulation and before the wavelength conversion. The first modulation unit 35 performs the frequency modulation on the X-polarized signal light (input signal light) and the X-polarized excitation light, and the wavelengths of the X-polarized signal light and the X-polarized excitation light fluctuate in accordance with the frequency modulation. As a result, the first modulation unit 35 may suppress stimulated Brillouin scattering (SBS) of the X-polarized signal light and the X-polarized excitation light.

Also, the second modulation unit 36 performs the frequency modulation on the Y-polarized signal light (input signal light) and the Y-polarized excitation light, and the wavelengths of the Y-polarized signal light and the Y-polarized excitation light fluctuate in accordance with the frequency modulation. As a result, the second modulation unit 36 may suppress SBS of the Y-polarized signal light and the Y-polarized excitation light.

Figure 4:
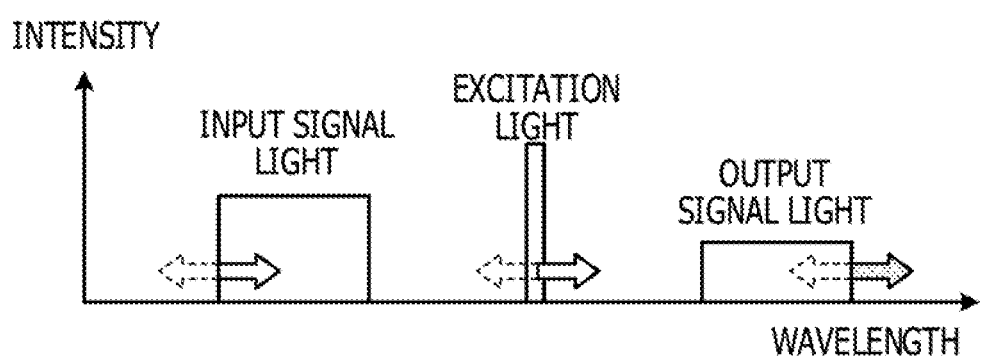
FIG. 4 is an explanatory view illustrating examples of the signal light after the modulation and before the wavelength conversion, the excitation light after the modulation, and the signal light after the modulation and the wavelength conversion.

FIG. 4 is an explanatory view illustrating examples of the signal light after the modulation and before the wavelength conversion, the excitation light after the modulation, and the signal light after the modulation and the wavelength conversion. The wavelength conversion unit 41 multiplexes the X-polarized signal light and the X-polarized excitation light after the frequency modulation performed by the first modulation unit 35 and performs the wavelength conversion on the X-polarized signal light after the frequency modulation to obtain the X-polarized signal light of a different wavelength (output signal light) in accordance with the excitation light after the frequency modulation. The wavelength of the output signal light also fluctuates in accordance with the frequency modulation. The first modulation unit 35 may remove the modulation component from the X-polarized signal light after the wavelength conversion by performing on the X-polarized signal light after the wavelength conversion frequency modulation in opposite phase to the frequency modulation before the wavelength conversion. Also, the wavelength conversion unit 41 multiplexes the Y-polarized signal light and the Y-polarized excitation light after the frequency modulation performed by the second modulation unit 36 and performs the wavelength conversion on the Y-polarized signal light after the frequency modulation to obtain the Y-polarized signal light of a different wavelength (output signal light) in accordance with the excitation light after the frequency modulation. The wavelength of the output signal light also fluctuates in accordance with the frequency modulation. The second modulation unit 36 may remove the modulation component from the Y-polarized signal light after the wavelength conversion by performing on the Y-polarized signal light after the wavelength conversion the frequency modulation in opposite phase to the frequency modulation before the wavelength conversion.

Next, operation of the wavelength conversion device 20 according to the first embodiment is described. The first WDM coupler 33 multiplexes the X-polarized and Y-polarized signal light from the signal light input unit 31 and the X-polarized excitation light from the excitation light source 32 and outputs the signal light and excitation light that have been multiplexed to the first PBS 34. The first PBS 34 splits the signal light and the excitation light from the first WDM coupler 33 into the X-polarized signal light, the X-polarized excitation light, and the Y-polarized signal light. The first PBS 34 outputs the X-polarized signal light and the X-polarized excitation light to the first modulation unit 35 and outputs the Y-polarized signal light to the second modulation unit 36.

The first modulation unit 35 performs the frequency modulation on the X-polarized signal light and the X-polarized excitation light. As a result, the SBS component of the X-polarized signal light after the wavelength conversion is suppressed by the frequency modulation. The first modulation unit 35 outputs to the second PBS 37 the X-polarized signal light and the X-polarized excitation light after the frequency modulation. The second modulation unit 36 performs the frequency modulation on the Y-polarized signal light. As a result, the SS component of the Y-polarized signal light after the wavelength conversion is suppressed by the frequency modulation. The second modulation unit 36 outputs to the second PBS 37 the Y-polarized signal light after the frequency modulation. The second PBS 37 multiplexes the X-polarized signal light and the X-polarized excitation light after the modulation from the first modulation unit 35 and the Y-polarized signal light after the modulation from the second modulation unit 36 and outputs to the 45-degree rotation unit 38 the signal light and excitation light that have been multiplexed.

The 45-degree rotation unit 38 rotates by 45 degrees the modulated X-polarized and Y-polarized signal light and the modulated X-polarized excitation light from the second PBS 37 that have been multiplexed. The 45-degree rotation unit 38 outputs to the third PBS 39 the signal light and the excitation light that have been rotated by 45 degrees. When the polarization of the excitation light is rotated by 45 degrees, an excitation light component is output from both the X port 41A and the Y port 41B of the third PBS 39, which will be described later. Thus, the wavelengths of both an X-polarized component and a Y-polarized component of the signal light that propagate through the wavelength conversion unit may be converted.

The third PBS 39 extracts from the signal light and the excitation light that have been rotated by 45 degrees the X-polarized component of the X-polarized signal light that has been rotated by 45 degrees, the X-polarized component of the Y-polarized signal light that has been rotated by 45 degrees, and the signal light and the excitation light of the X-polarized components that include an X-polarized component of the X-polarized excitation light that has been rotated by 45 degrees. The third PBS 39 outputs the signal light and the excitation light of the X-polarized component from the X port 41A.

The wavelength conversion unit 41 multiplexes the following components input from the X port 41A: the X-polarized component of the X-polarized signal light that has been rotated by 45 degrees; the X-polarized component of the Y-polarized signal light that has been rotated by 45 degrees; and the X-polarized component of the X-polarized excitation light that has been rotated by 45 degrees. The wavelength conversion unit 41 performs the wavelength conversion on the X-polarized component of the signal light of a first wavelength to obtain the X-polarized component of the signal light of a second wavelength in accordance with the X-polarized component of the excitation light. The wavelength conversion unit 41 inputs the X-polarized component of the signal light of the second wavelength after the wavelength conversion to the 90-degree rotation unit 40A. The 90-degree rotation unit 40A rotates the X-polarized component of the signal light of the second wavelength by 90 degrees to input the Y-polarized component of the signal light of the second wavelength to the Y port 41B of the third PBS 39.

The third PBS 39 extracts the following components from the signal light and the excitation light that have been rotated by 45 degrees from the 45-degree rotation unit 38: the Y-polarized component of the X-polarized signal light that has been rotated by 45 degrees; the Y-polarized component of the Y-polarized signal light that has been rotated by 45 degrees; and the Y-polarized component of the X-polarized excitation light that has been rotated by 45 degrees. The third PBS 39 synthesizes, for example, the following signal light and the excitation light of the Y-polarized components: the Y-polarized component of the X-polarized signal light that has been rotated by 45 degrees; the Y-polarized component of the Y-polarized signal light that has been rotated by 45 degrees, and the Y-polarized component of the X-polarized excitation light that has been rotated by 45 degrees. The third PBS 39 outputs from the Y port 41B the Y-polarized component of the signal light of the first wavelength and the Y-polarized component of the excitation light that have been synthesized.

The 90-degree rotation unit 40A rotates by 90 degrees the Y-polarized component of the signal light of the first wavelength and the Y-polarized component of the excitation light from the Y port 41B of the third PBS 39 to input to the wavelength conversion unit 41 the X-polarized component of the signal light of the first wavelength and the X-polarized component of the excitation light. The wavelength conversion unit 41 multiplexes the X-polarized component of the signal light of the first wavelength and the X-polarized component of the excitation light input from the 90-degree rotation unit 40A and performs wavelength conversion to obtain the X-polarized component of the signal light of the second wavelength in accordance with the X-polarized component of the excitation light. The wavelength conversion unit 41 inputs the X-polarized component of the signal light of the second wavelength after the wavelength conversion to the X port 41A of the third PBS 39.

The third PBS 39 multiplexes the Y-polarized component of the signal light of the second wavelength after the wavelength conversion from the Y port 41B and the X-polarized component of the signal light of the second wavelength after the wavelength conversion from the X port 41A. The third PBS 39 inputs to the 45-degree rotation unit 38 the X-polarized component and the Y-polarized component of the signal light of the second wavelength that have been multiplexed. The 45-degree rotation unit 38 rotates by 45 degrees the X-polarized component and the Y-polarized component of the signal light of the second wavelength, from the third PBS 39, that have been multiplexed. The 45-degree rotation unit 38 inputs the X-polarized component and the Y-polarized component of the signal light of the second wavelength that have been rotated by 45 degrees to the second PBS 37.

The second PBS 37 splits the X-polarized component and the Y-polarized component of the signal light of the second wavelength that have been rotated by 45 degrees into the X-polarized signal light of the second wavelength and the Y-polarized signal light of the second wavelength. The second PBS 37 inputs the X-polarized signal light of the second wavelength to the first modulation unit 35 and the Y-polarized signal light of the second wavelength to the second modulation unit 36.

The first modulation unit 35 performs the frequency modulation so as to minimize the modulation component in the X-polarized signal light of the second wavelength returned from the second PBS 37. The first modulation unit 35 removes from the X-polarized signal light of the second wavelength after the wavelength conversion the modulation component generated by the frequency modulation performed on the X-polarized signal light of the first wavelength before the wavelength conversion. For example, the first modulation unit 35 removes the modulation component from the X-polarized signal light after the wavelength conversion by using a modulation component the amount of which is the same as and the phase of which is opposite to the modulation component generated by the frequency modulation performed on the X-polarized signal light before the wavelength conversion. The first modulation unit 35 inputs to the first PBS 34 the X-polarized signal light of the second wavelength from which the modulation component has been removed.

The second modulation unit 36 performs the frequency modulation so as to minimize the modulation component in the Y-polarized signal light of the second wavelength returned from the second PBS 37. The second modulation unit 36 removes from the Y-polarized signal light of the second wavelength after the wavelength conversion the modulation component generated by the frequency modulation performed on the Y-polarized signal light of the first wavelength before the wavelength conversion. For example, the second modulation unit 36 removes the modulation component from the Y-polarized signal light after the wavelength conversion by using a modulation component the amount of which is the same as and the phase of which is opposite to the modulation component generated by the frequency modulation performed on the Y-polarized signal light before the wavelength conversion. The second modulation unit 36 inputs to the first PBS 34 the Y-polarized signal light of the second wavelength from which the modulation component has been removed.

The first PBS 34 multiplexes the X-polarized signal light of the second wavelength and the X-polarized excitation light, from the first modulation unit 35, from which the modulation component has been removed and the Y-polarized signal light of the second wavelength, from the second modulation unit 36, from which the modulation component has been removed. The first PBS 34 inputs the multiplexed light to the second WDM coupler 42. The second WDM coupler 42 outputs to the signal light output unit 43 polarization multiplexed signal light including the X-polarized signal light of the second wavelength and the Y-polarized signal light of the second wavelength from the multiplexed light of the first PBS 34.

The first modulation unit 35 according to the first embodiment modulates the X-polarized signal light before the wavelength conversion to output the X-polarized signal light after the modulation to the wavelength conversion unit 41 and minimizes the modulation component in the X-polarized signal light after the wavelength conversion returned from the wavelength conversion unit 41 to output. The second modulation unit 36 modulates the Y-polarized signal light before the wavelength conversion to output the Y-polarized signal light after the modulation to the wavelength conversion unit 41 and minimizes the modulation component in the Y-polarized signal light after the wavelength conversion returned from the wavelength conversion unit 41 to output. The first PBS 34 multiplexes the X-polarized signal light after the wavelength conversion output from the first modulation unit 35 and the Y-polarized signal light after the wavelength conversion output from the second modulation unit 36 to output the polarization multiplexed signal. For example, the SBS components of the X-polarized and Y-polarized signal light (polarization multiplexed signal light) are suppressed, and the modulation components are removed from of the X-polarized and Y-polarized signal light (polarization multiplexed signal light). As a result, degradation of the signal characteristics of the polarization multiplexed signal light after the wavelength conversion may be suppressed. Furthermore, compared to the related art, the configuration may be simplified by reducing the numbers of modulation units and drivers, and the power consumption of the drivers may be reduced.

In the wavelength conversion device 20 according to the above-described first embodiment, the first modulation unit 35 performs the frequency modulation on the X-polarized signal light, outputs the X-polarized signal light after the modulation to the wavelength conversion unit 41, and removes the modulation component from the X-polarized signal light after the wavelength conversion in the wavelength conversion unit 41. Likewise, the second modulation unit 36 performs the frequency modulation on the Y-polarized signal light, outputs the Y-polarized signal light after the modulation to the wavelength conversion unit 41, and removes the modulation component from the Y-polarized signal light after the wavelength conversion in the wavelength conversion unit 41. A detection unit that monitors whether the modulation components are removed by the first modulation unit 35 and the second modulation unit 36 may be provided in the wavelength conversion device 20. An embodiment of this will be described below as a second embodiment.

Second Embodiment

Figure 5:
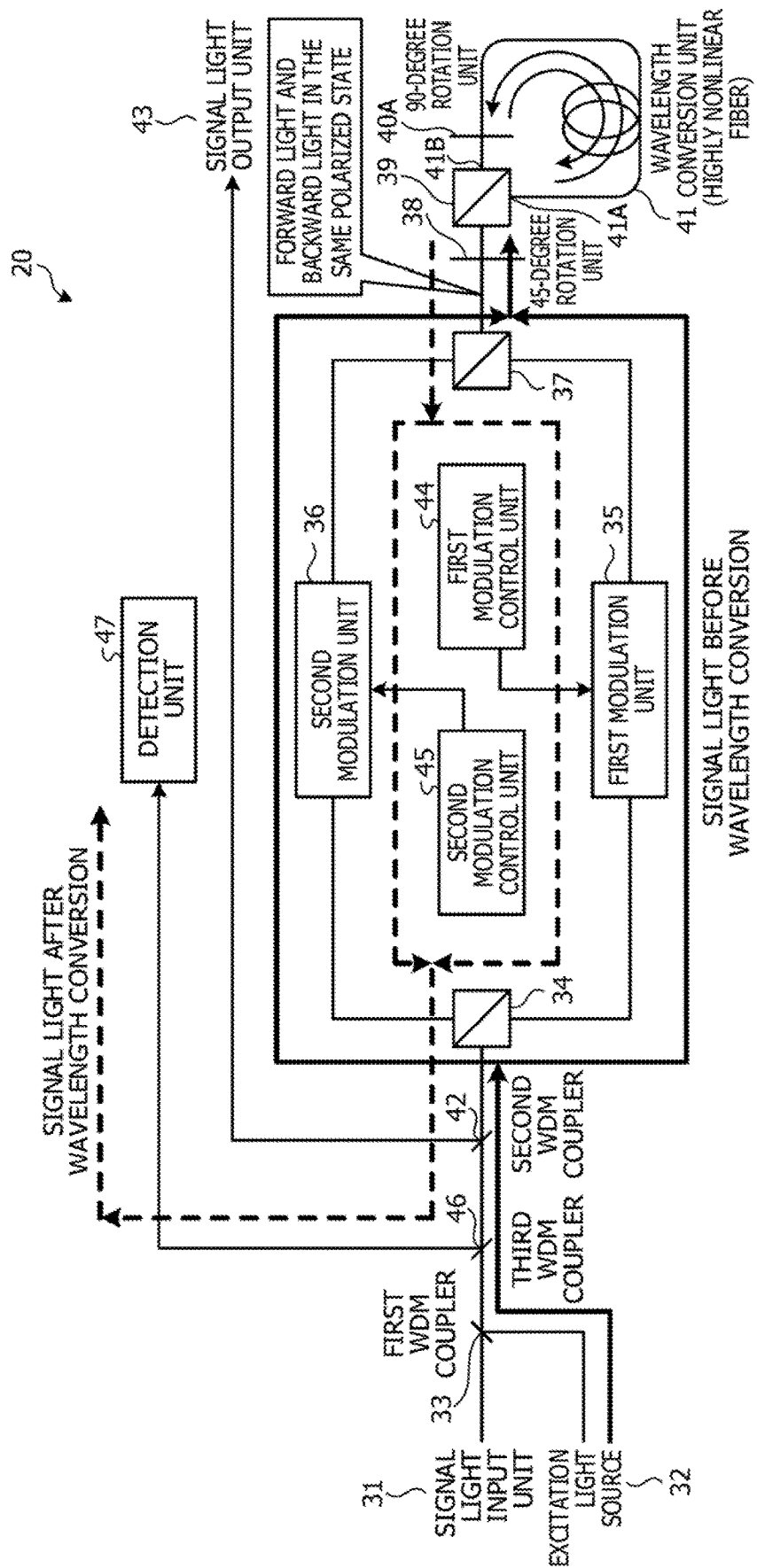
FIG. 5 is an explanatory view illustrating an example of a wavelength conversion device according to a second embodiment.

FIG. 5 is an explanatory view illustrating an example of the wavelength conversion device 20 according to the second embodiment. The same elements as those of the wavelength conversion device 20 according to the first embodiment are denoted by the same reference signs, thereby omitting the redundant description of the elements and operation.

The wavelength conversion device 20 illustrated in FIG. 5 is different from the wavelength conversion device 20 illustrated in FIG. 2 in that the wavelength conversion device 20 illustrated in FIG. 5 includes a detection unit 47 that detects the modulation component of the excitation light after the wavelength conversion. The excitation light source 32 inputs the X-polarized excitation light and the Y-polarized excitation light to the first WDM coupler 33. A third WDM coupler 46 is disposed between the first WDM coupler 33 and the second WDM coupler 42. The third WDM coupler 46 splits the excitation light after the wavelength conversion input from the first PBS 34. The detection unit 47 detects a residual modulation component of the excitation light after the wavelength conversion split by the third WDM coupler 46.

Figure 6:
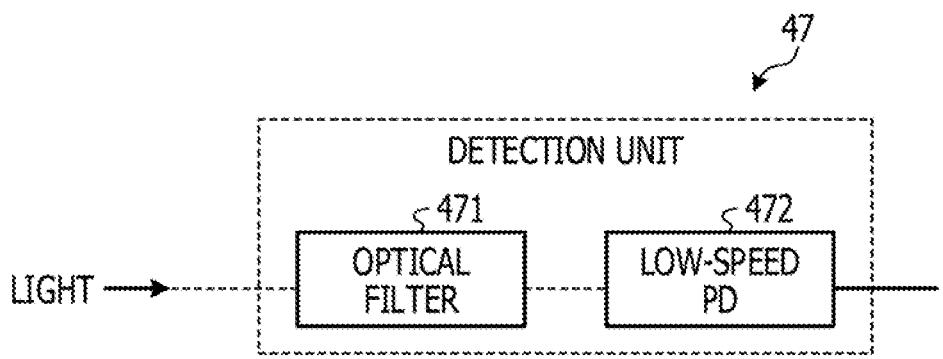
FIG. 6 is an explanatory view illustrating an example of a detection unit.

FIG. 6 is an explanatory view illustrating an example of the detection unit 47. The detection unit 47 illustrated in FIG. 6 includes an optical filter 471 and a low-speed photo diode (PD) 472. The optical filter 471, which exhibits wavelength dependent loss, extracts the modulation component from the excitation light after the wavelength conversion split by the third WDM coupler 46. The optical filter 471 transmits the modulation component of the excitation light and outputs the modulation component to the low-speed PD 472. The low-speed PD 472 is a photoelectric converter that converts a modulation component into electricity. The low-speed PD 472 outputs the modulation component that has been converted into electricity.

Figure 7:
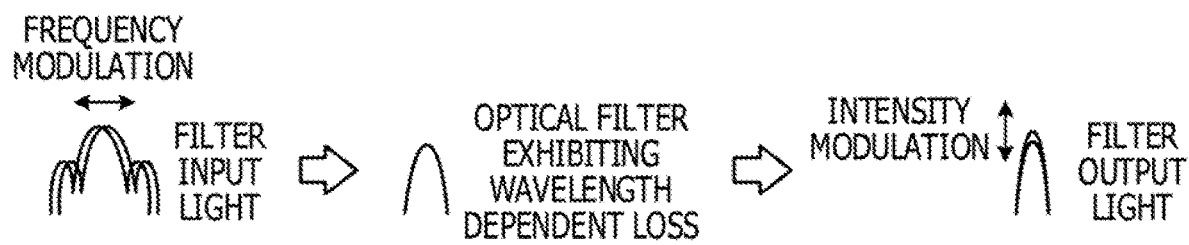
FIG. 7 is an explanatory view illustrating an example of processing performed by an optical filter of the detection unit.

FIG. 7 is an explanatory view illustrating an example of processing performed by the optical filter 471 of the detection unit 47. The optical filter 471 includes, for example, a wavelength filter having a characteristic of reducing loss for a particular wavelength, a filter having a periodic loss characteristic, or the like. The optical filter 471 converts the modulation component of the excitation light into an intensity modulation component and outputs to the low-speed PD 472 the intensity modulation component as the modulation component. For example, the detection unit 47 may detect the modulation component of the excitation light.

Next, operation of the wavelength conversion device 20 according to the second embodiment is described. The first WDM coupler 33 multiplexes the X-polarized signal light and the Y-polarized signal light from the signal light input unit 31 and the X-polarized excitation light and the Y-polarized excitation light from the excitation light source 32 and inputs the signal light and excitation light that have been multiplexed to the first PBS 34. The first PBS 34 splits the signal light and the excitation light that have been multiplexed into the X-polarized signal light, the X-polarized excitation light, the Y-polarized signal light, and the Y-polarized excitation light. The first PBS 34 inputs the X-polarized signal light and the X-polarized excitation light to the first modulation unit 35 and inputs the Y-polarized signal light and the Y-polarized excitation light to the second modulation unit 36.

The first modulation unit 35 performs the frequency modulation on the X-polarized signal light and the X-polarized excitation light and inputs the X-polarized signal light and the X-polarized excitation light after the frequency modulation to the second PBS 37. The second modulation unit 36 performs the frequency modulation on the Y-polarized signal light and the Y-polarized excitation light and inputs the Y-polarized signal light and the Y-polarized excitation light after the frequency modulation to the second PBS 37. The second PBS 37 multiplexes the X-polarized signal light and the X-polarized excitation light after the frequency modulation and the Y-polarized signal light and the Y-polarized excitation light after the frequency modulation and inputs the multiplexed light to the 45-degree rotation unit 38.

The second PBS 37 splits the signal light and the excitation light after the wavelength conversion into the X-polarized signal light, the X-polarized excitation light, the Y-polarized signal light, and the Y-polarized excitation light. The second PBS 37 inputs the X-polarized signal light and the X-polarized excitation light after the wavelength conversion to the first modulation unit 35 and inputs the Y-polarized signal light and the Y-polarized excitation light after the wavelength conversion to the second modulation unit 36.

The first modulation unit 35 performs the frequency modulation in opposite phase on the X-polarized signal light and the X-polarized excitation light after the wavelength conversion returned from the second PBS 37, thereby removing the remaining modulation component. The second modulation unit 36 performs the frequency modulation in opposite phase on the Y-polarized signal light and the Y-polarized excitation light after the wavelength conversion returned from the second PBS 37, thereby removing the remaining modulation component.

The first PBS 34 multiplexes the X-polarized signal light and the X-polarized excitation light after the wavelength conversion input from the first modulation unit 35 and the Y-polarized signal light and the Y-polarized excitation light after the wavelength conversion input from the second modulation unit 36. The second WDM coupler 42 splits the signal light and the excitation light after the wavelength conversion that have been multiplexed by the first PBS 34 into the signal light after the wavelength conversion and the excitation light after the wavelength conversion. The second WDM coupler 42 outputs the signal light after the wavelength conversion to the signal light output unit 43 and outputs the excitation light after the wavelength conversion to the third WDM coupler 46. The third WDM coupler 46 outputs the excitation light after the wavelength conversion to the detection unit 47.

The detection unit 47 detects the modulation component of the excitation light after the wavelength conversion input from the third WDM coupler 46. The first modulation control unit 44 grasps a residual state of the modulation component of the X-polarized signal light of the first modulation unit 35 with the modulation component of the excitation light after the wavelength conversion. The second modulation control unit 45 grasps a residual state of the modulation component of the Y-polarized signal light of the second modulation unit 36 with the modulation component of the excitation light after the wavelength conversion.

The detection unit 47 according to the second embodiment detects the modulation component of the excitation light after the wavelength conversion output from the first modulation unit 35. The first modulation control unit 44 grasps the residual state of the modulation component of the X-polarized signal light of the first modulation unit 35 by using the modulation component of the excitation light after the wavelength conversion. For example, when the modulation component included in the signal light is removed, by focusing on the fact that the modulation component is also removed from the excitation light that has propagated through the first modulation unit 35 after the wavelength conversion, whether the modulation component is removed may be monitored with the excitation light without monitoring the signal light.

Although in the case exemplified with the wavelength conversion device 20 according to the second embodiment, the detection unit 47 detects the modulation component of the excitation light, the first modulation unit 35 may be controlled in accordance with a detection result of the detection unit 47. An embodiment of this will be described below as a third embodiment.

Third Embodiment

Figure 8:
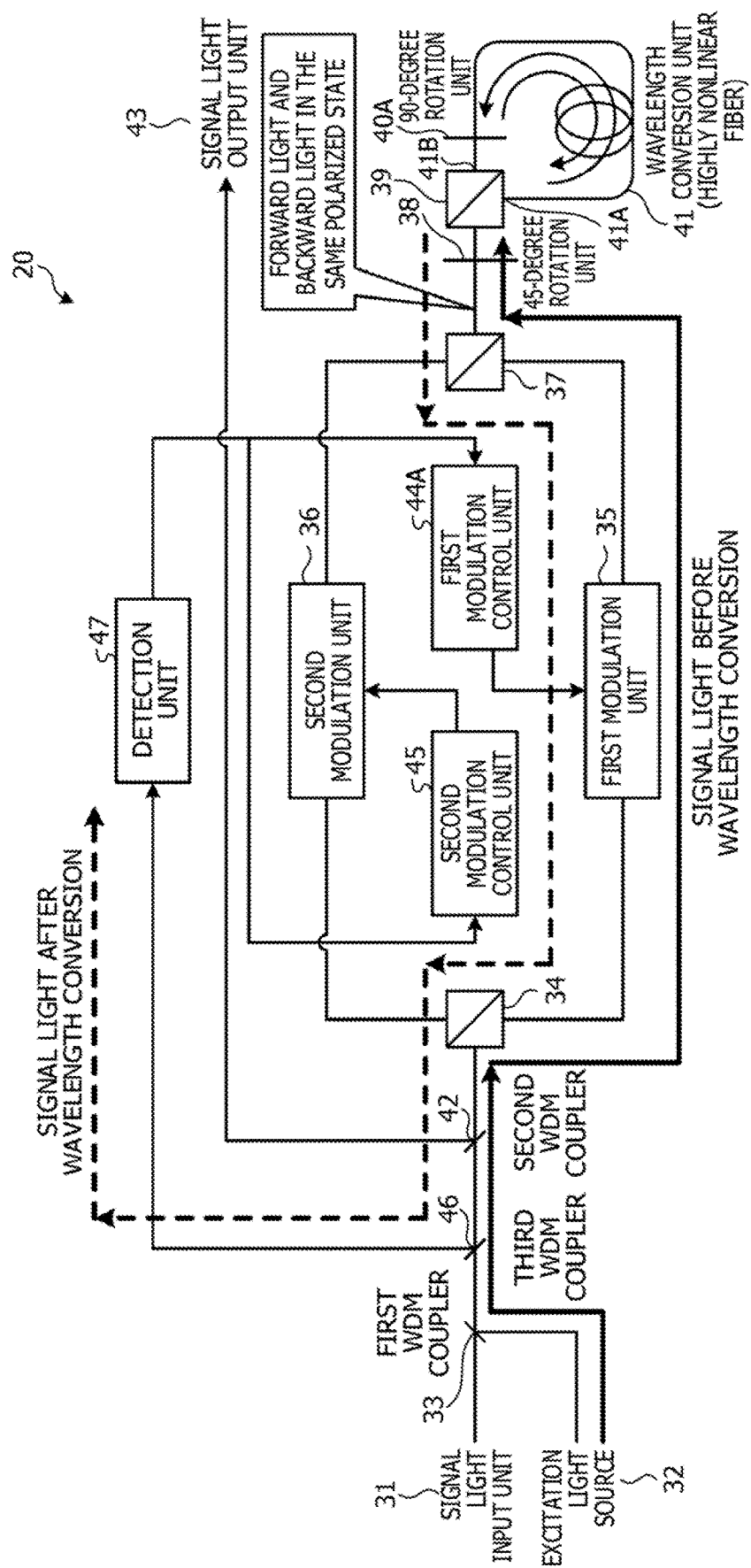
FIG. 8 is an explanatory view illustrating an example of a wavelength conversion device according to a third embodiment.

FIG. 8 is an explanatory view illustrating an example of the wavelength conversion device 20 according to the third embodiment. The same elements as those of the wavelength conversion device 20 according to the first embodiment are denoted by the same reference signs, thereby omitting the redundant description of the elements and operation.

The wavelength conversion device 20 illustrated in FIG. 8 is different from the wavelength conversion device 20 illustrated in FIG. 2 in that the first modulation unit 35 is controlled in accordance with the residual modulation component of the X-polarized excitation light after the wavelength conversion. The excitation light source 32 emits, for example, X-polarized excitation light. The third WDM coupler 46 is disposed between the first WDM coupler 33 and the second WDM coupler 42. The third WDM coupler 46 splits the X-polarized excitation light after the wavelength conversion input from the first PBS 34.

A first modulation control unit 44A controls the first modulation unit 35 to perform the frequency modulation in opposite phase that removes the residual modulation component in a forward path of the first modulation unit 35 in accordance with the detection result of the detection unit 47, for example, the residual modulation component of the X-polarized excitation light after the wavelength conversion.

The second modulation control unit 45 stores the modulation component generated in the modulation in a forward path of the second modulation unit 36, thereby controlling the second modulation unit 36 to perform the frequency modulation in opposite phase that removes the residual modulation component in the forward path of the second modulation unit 36 in accordance with the stored modulation component.

Figure 9:
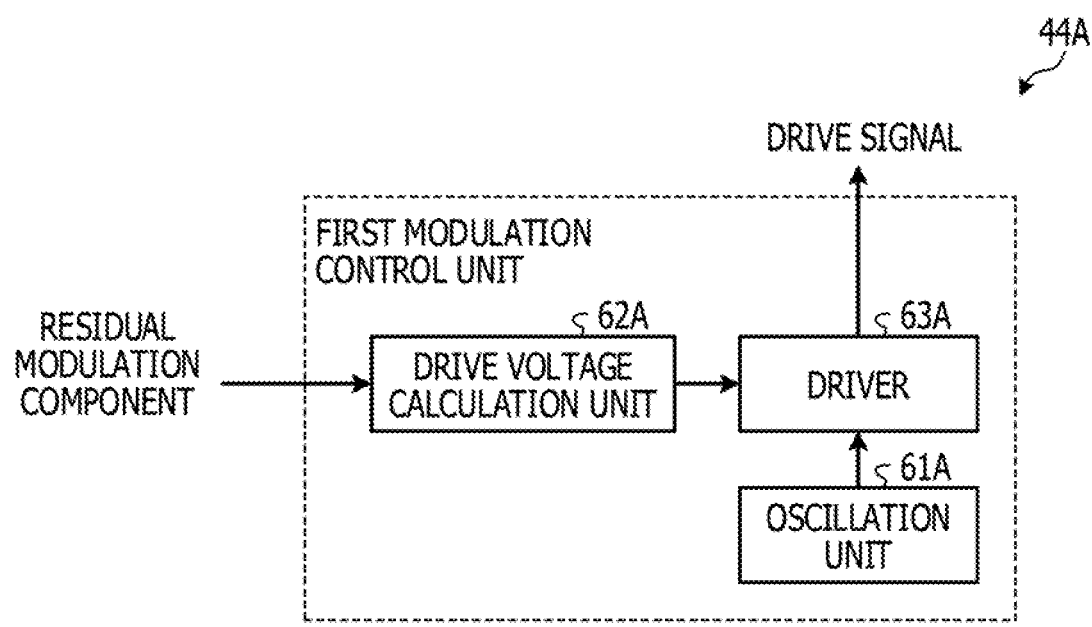
FIG. 9 is an explanatory view illustrating an example of a first modulation control unit.

FIG. 9 is an explanatory view illustrating an example of the first modulation control unit 44A. The first modulation control unit 44A illustrated in FIG. 9 includes an oscillation unit 61A, a drive voltage calculation unit 62A, and a driver 63A. The oscillation unit 61A generates oscillation of a modulation frequency (sine wave). The drive voltage calculation unit 62A calculates a drive voltage corresponding to the residual modulation component of the excitation light from the detection unit 47. The drive voltage calculation unit 62A may refer to a table for controlling a drive voltage amount corresponding to the residual modulation component to obtain the drive voltage amount corresponding to the residual modulation component. The driver 63A applies the drive voltage to the modulation frequency (sine wave) from the oscillation unit 61A, thereby outputting a drive signal for controlling the first modulation unit 35. The first modulation unit 35 performs the frequency modulation on the X-polarized signal light and the X-polarized excitation light in accordance with the drive signal. The first modulation control unit 44A controls the first modulation unit 35 to perform the frequency modulation on the X-polarized signal light and the X-polarized excitation light in the forward path of the first modulation unit 35. The first modulation control unit 44A controls the first modulation unit 35 to perform the frequency modulation in opposite phase that removes the residual modulation components in the X-polarized signal light and the X-polarized excitation light in a backward path of the first modulation unit 35.

Next, operation of the wavelength conversion device 20 according to the third embodiment is described. The first WDM coupler 33 multiplexes the X-polarized signal light and Y-polarized signal light input from the signal light input unit 31 and the X-polarized excitation light input from the excitation light source 32. The first PBS 34 splits the signal light and the excitation light multiplexed by the first WDM coupler 33 into the X-polarized signal light, the X-polarized excitation light, and the Y-polarized signal light. The first PBS 34 inputs the X-polarized signal light and the X-polarized excitation light to the first modulation unit 35 and inputs the Y-polarized signal light to the second modulation unit 36.

The first modulation unit 35 performs the frequency modulation on the X-polarized signal light and the X-polarized excitation light and inputs the X-polarized signal light and the X-polarized excitation light after the frequency modulation to the second PBS 37. The second modulation unit 36 performs the frequency modulation on the Y-polarized signal light and inputs the Y-polarized signal light after the frequency modulation to the second PBS 37. The second PBS 37 multiplexes the X-polarized signal light and the X-polarized excitation light after the frequency modulation and the Y-polarized signal light after the frequency modulation. The 45-degree rotation unit 38 rotates by 45 degrees the signal light and the excitation light after the frequency modulation input from the second PBS 37. The third PBS 39 splits the signal light and the excitation light that have been rotated by 45 degrees and input from the 45-degree rotation unit 38 into the X-polarized component and the Y-polarized component. The third PBS 39 outputs from the X port 41A the X-polarized components of the signal light and the excitation light that have been rotated by 45 degrees and outputs from the Y port 41B the Y-polarized components of the signal light and the excitation light that have been rotated by 45 degrees.

The wavelength conversion unit 41 multiplexes the X-polarized component of the signal light and the X-polarized component of the excitation light input from the X port 41A to input the X-polarized component of the signal light of the second wavelength and the X-polarized component of the excitation light to the 90-degree rotation unit 40A in accordance with the X-polarized component of the excitation light. The 90-degree rotation unit 40A rotates by 90 degrees the X-polarized component of the signal light of the second wavelength and the Y-polarized component of the excitation light after the wavelength conversion. For example, the 90-degree rotation unit 40A inputs to the Y port 41B of the third PBS 39 the Y-polarized component of the signal light of the second wavelength and the Y-polarized component of the excitation light after the wavelength conversion.

The 90-degree rotation unit 40A rotates by 90 degrees the Y-polarized component of the signal light and the Y-polarized component of the excitation light that have been rotated by 45 degrees and input from the Y port 41B of the third PBS 39. For example, the 90-degree rotation unit 40A outputs to the wavelength conversion unit 41 the X-polarized component of the signal light and the X-polarized component of the excitation light. The wavelength conversion unit 41 multiplexes the X-polarized component of the signal light and the X-polarized component of the excitation light that have been rotated by 90 degrees and input from the 90-degree rotation unit 40A to perform the wavelength conversion to obtain the X-polarized component of the signal light and the X-polarized component of the excitation light in accordance with the X-polarized component of the excitation light. Then, the wavelength conversion unit 41 outputs from the X-port 41A the X-polarized component of the signal light and the X-polarized component of the excitation light after the wavelength conversion.

The third PBS 39 multiplexes the X-polarized component of the signal light and the X-polarized component of the excitation light from the X port 41A and the Y-polarized component of the signal light and the Y-polarized component of the excitation light from the Y port 418. The 45-degree rotation unit 38 rotates by 45 degrees the X-polarized component of the signal light, the Y-polarized component of the signal light, the X-polarized component of the excitation light, and the Y-polarized component of the excitation light after the wavelength conversion input from the third PBS 39. For example, the 45-degree rotation unit 38 outputs the X-polarized and Y-polarized signal light and the X-polarized excitation light after the wavelength conversion. The second PBS 37 splits the signal light and the excitation light after the wavelength conversion into the X-polarized signal light, the X-polarized excitation light, and the Y-polarized signal light. The second PBS 37 outputs the X-polarized signal light and the X-polarized excitation light to the first modulation unit 35 and outputs the Y-polarized signal light to the second modulation unit 36.

The first modulation unit 35 performs, in accordance with the control performed by the first modulation control unit 44A, the frequency modulation in opposite phase that removes the residual modulation components of the returned X-polarized signal light and the X-polarized excitation light after the wavelength conversion. The second modulation unit 36 performs, in accordance with the control performed by the second modulation control unit 45, the frequency modulation in opposite phase that removes the returned residual modulation component of the Y-polarized signal light after the wavelength conversion. The first PBS 34 multiplexes the X-polarized signal light and the X-polarized excitation light after the wavelength conversion input from the first modulation unit 35 and the Y-polarized signal light after the wavelength conversion input from the second modulation unit 36.

The second WDM coupler 42 splits the signal light and the excitation light after the wavelength conversion input from the first PBS 34 into the signal light after the wavelength conversion and the excitation light after the wavelength conversion. The second WDM coupler 42 outputs the signal light after the wavelength conversion to the signal light output unit 43 and outputs the excitation light after the wavelength conversion to the third WDM coupler 46. The third WDM coupler 46 outputs the excitation light after the wavelength conversion to the detection unit 47. The detection unit 47 detects the residual modulation component in the X-polarized excitation light after the wavelength conversion.

The first modulation control unit 44A causes, in accordance with the detection result of the detection unit 47, for example, the residual modulation component of the excitation light, the frequency modulation in opposite phase to be performed to minimize the residual modulation components of the X-polarized signal light and the X-polarized excitation light after the wavelength conversion. As a result, the first modulation unit 35 may remove the residual modulation components from the X-polarized signal light and the X-polarized excitation light in the backward path, for example, from the X-polarized signal light and the X-polarized excitation light after the wavelength conversion. The second modulation control unit 45 stores the frequency modulation component in the forward path of the second modulation unit 36, thereby causing the residual modulation component to be removed in the backward path of the second modulation unit 36 in accordance with the frequency modulation component in the forward path.

Figure 10:
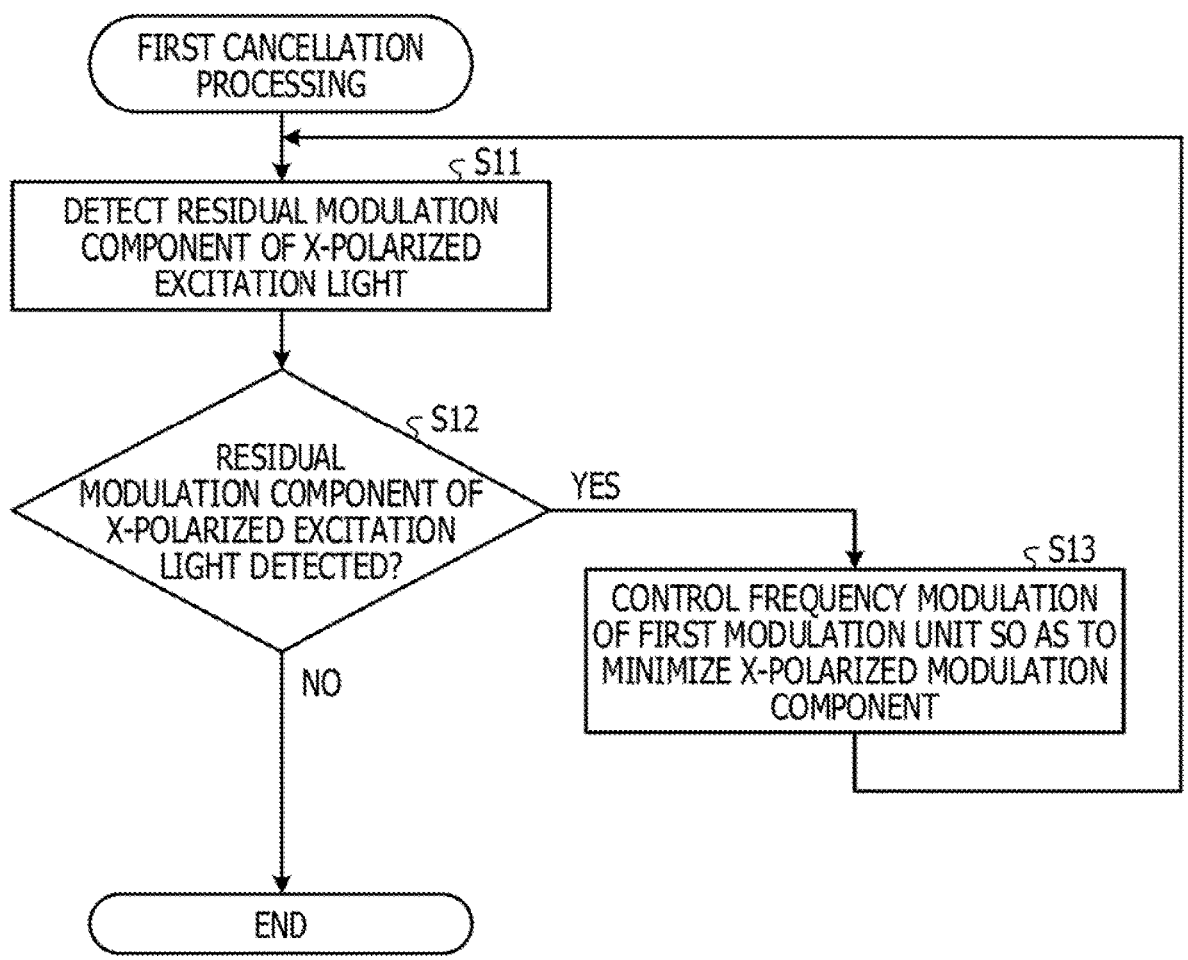
FIG. 10 is a flowchart illustrating an example of a processing operation of the wavelength conversion device related to first cancellation processing.

FIG. 10 is a flowchart illustrating an example of a processing operation of the wavelength conversion device 20 related to first cancellation processing. In FIG. 10, the detection unit 47 in the wavelength conversion device 20 performs a detection operation for the residual modulation component of the X-polarized excitation light (step S11). The first modulation control unit 44A in the wavelength conversion device 20 determines whether the residual modulation component of the X-polarized excitation light is detected (step S12). When the residual modulation component of the X polarization is detected (Yes in step S12), the first modulation control unit 44A controls the first modulation unit 35 so as to minimize the residual modulation components of the X-polarized signal light and the X-polarized excitation light (step S13).

After controlling the first modulation unit 35, the first modulation control unit 44A moves to step S11 to perform the detection operation for the residual modulation component of the X-polarized excitation light. When the residual modulation component of the X-polarized excitation light is not detected (No in step S12), the first modulation control unit 44A ends the processing operation illustrated in FIG. 10.

The detection unit 47 according to the third embodiment detects the modulation component of the excitation light after the wavelength conversion output from the first modulation unit 35. In accordance with the modulation component in the excitation light after the wavelength conversion detected by the detection unit 47, the first modulation control unit 44A controls the first modulation unit 35 so as to minimize the modulation component in the X-polarized signal light after the wavelength conversion. As a result, the modulation component of the X-polarized signal light may be removed without monitoring the signal light.

In the case exemplified with the wavelength conversion device 20 according to the third embodiment, the residual modulation component of the X-polarized excitation light after the wavelength conversion is detected, and, in accordance with the detection result, the first modulation unit 35 is controlled so as to remove the residual modulation component of the signal light after the wavelength conversion. However, this is not limiting, and another embodiment will be described below as a fourth embodiment.

Fourth Embodiment

Figure 11:
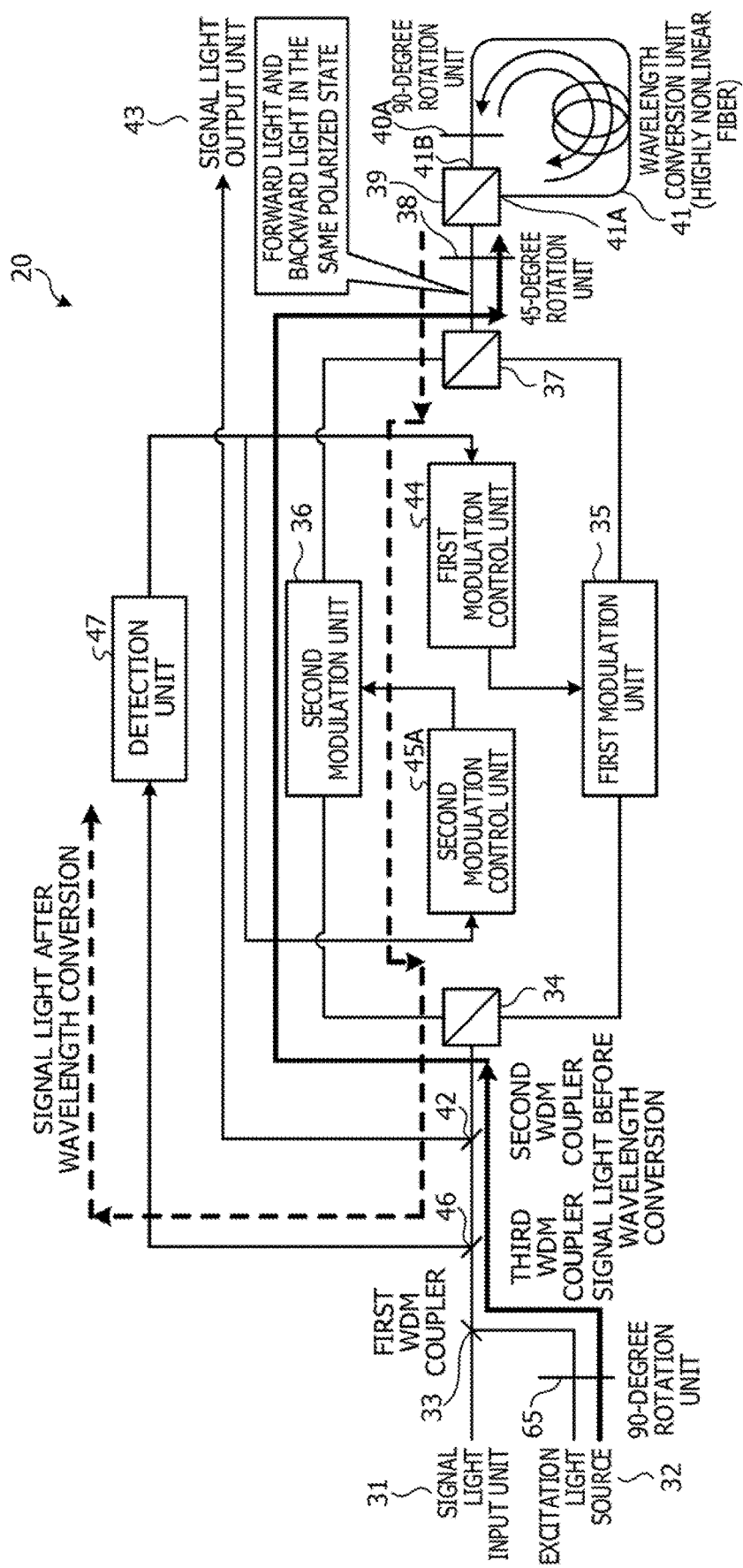
FIG. 11 is an explanatory view illustrating an example of a wavelength conversion device according to a fourth embodiment.

FIG. 11 is an explanatory view illustrating an example of the wavelength conversion device 20 according to the fourth embodiment. The same elements as those of the wavelength conversion device 20 according to the first embodiment are denoted by the same reference signs, thereby omitting the redundant description of the elements and operation.

The wavelength conversion device 20 illustrated in FIG. 11 is different from the wavelength conversion device 20 illustrated in FIG. 2 in that the second modulation unit 36 is controlled in accordance with the residual modulation component of the Y-polarized excitation light after the wavelength conversion. The excitation light source 32 emits, for example, X-polarized excitation light. A 90-degree rotation unit 65 is disposed between the excitation light source 32 and the first WDM coupler 33. The 90-degree rotation unit 65 rotates the X-polarized excitation light input from the excitation light source 32 by 90 degrees to convert this X-polarized excitation light into Y-polarized excitation light. The third WDM coupler 46 is disposed between the first WDM coupler 33 and the second WDM coupler 42. The third WDM coupler 46 splits Y-polarized excitation light after the wavelength conversion input from the first PBS 34.

A second modulation control unit 45A controls the second modulation unit 36 to perform the frequency modulation in opposite phase that removes the residual modulation component in the backward path of the second modulation unit 36 in accordance with the detection result of the detection unit 47, for example, the residual modulation component of the Y-polarized excitation light after the wavelength conversion.

The first modulation control unit 44 stores the modulation component modulated in the forward path of the first modulation unit 35, thereby controlling the first modulation unit 35 to perform the frequency modulation in opposite phase that removes the residual modulation component in the backward path of the first modulation unit 35 in accordance with the stored modulation component.

Figure 12:
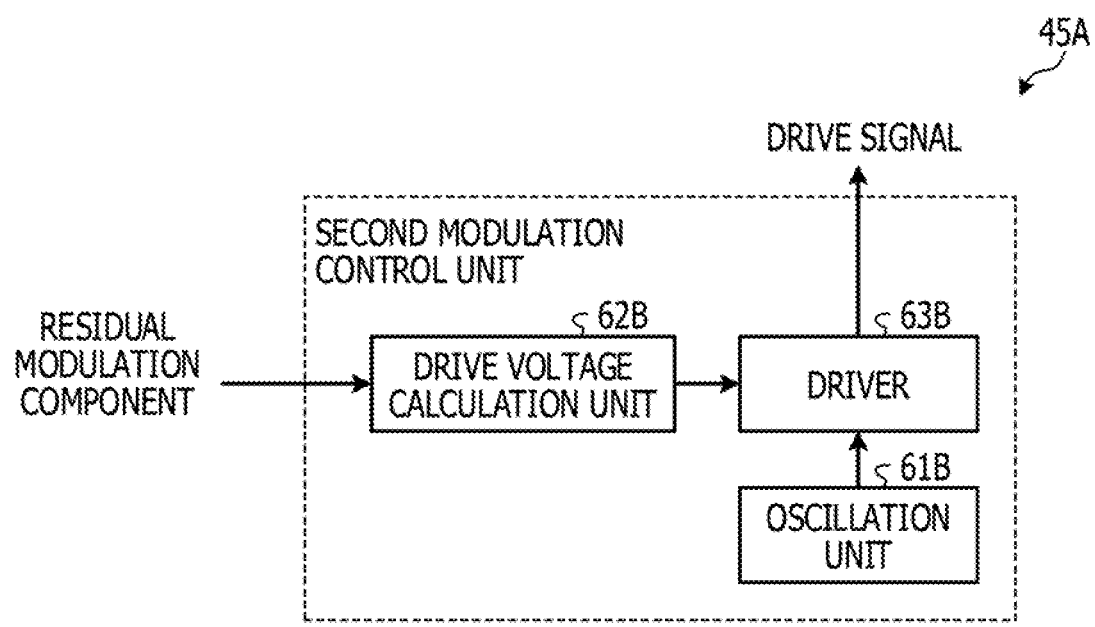
FIG. 12 is an explanatory view illustrating an example of a second modulation control unit.

FIG. 12 is an explanatory view illustrating an example of the second modulation control unit 45A. The second modulation control unit 45A illustrated in FIG. 12 includes an oscillation unit 61B, a drive voltage calculation unit 62B, and a driver 63B. The oscillation unit 61B generates oscillation of a modulation frequency (sine wave). The drive voltage calculation unit 62B calculates a drive voltage corresponding to the residual modulation component of the excitation light from the detection unit 47. The drive voltage calculation unit 62B may refer to a table for controlling a drive voltage amount corresponding to the residual modulation component to obtain the drive voltage amount corresponding to the residual modulation component. The driver 63B applies the drive voltage to the modulation frequency (sine wave) from the oscillation unit 61B, thereby outputting a drive signal for controlling the second modulation unit 36. The second modulation unit 36 performs the frequency modulation on the Y-polarized signal light and the Y-polarized excitation light in accordance with the drive signal. The second modulation control unit 45A controls the second modulation unit 36 to perform the frequency modulation on the Y-polarized signal light and the Y-polarized excitation light in the forward path of the second modulation unit 36.

The second modulation control unit 45A controls the second modulation unit 36 to perform the frequency modulation that removes the residual modulation components in the Y-polarized signal light and the Y-polarized excitation light in the backward path of the second modulation unit 36.

Next, operation of the wavelength conversion device 20 according to the fourth embodiment is described. The first WDM coupler 33 multiplexes the X-polarized signal light and the Y-polarized signal light input from the signal light input unit 31 and the Y-polarized excitation light input from the 90-degree rotation unit 65. The first PBS 34 splits the signal light and the excitation light multiplexed by the first WDM coupler 33 into the X-polarized signal light, the Y-polarized signal light, and the Y-polarized excitation light. The first PBS 34 inputs the X-polarized signal light to the first modulation unit 35 and inputs the Y-polarized excitation light and the Y-polarized signal light to the second modulation unit 36.

The first modulation unit 35 performs the frequency modulation on the X-polarized signal light and inputs the X-polarized signal light after the frequency modulation to the second PBS 37. The second modulation unit 36 performs the frequency modulation on the Y-polarized signal light and the Y-polarized excitation light and inputs the Y-polarized signal light and the Y-polarized excitation light after the frequency modulation to the second PBS 37. The second PBS 37 multiplexes the X-polarized signal light after the frequency modulation and the Y-polarized signal light and the Y-polarized excitation light after the frequency modulation. The 45-degree rotation unit 38 rotates by 45 degrees the signal light after the frequency modulation and the excitation light after the frequency modulation input from the second PBS 37. The third PBS 39 splits the signal light and the excitation light that have been rotated by 45 degrees into the X-polarized component and the Y-polarized component. The third PBS 39 outputs from the X port 41A the X-polarized components of the signal light and the excitation light that have been rotated by 45 degrees and outputs from the Y port 41B the Y-polarized components of the signal light and the excitation light that have been rotated by 45 degrees.

The wavelength conversion unit 41 multiplexes the X-polarized component of the signal light and the X-polarized component of the excitation light input from the X port 41A to input the X-polarized component of the signal light of the second wavelength and the X-polarized component of the excitation light to the 90-degree rotation unit 40A in accordance with the X-polarized component of the excitation light. The 90-degree rotation unit 40A rotates by 90 degrees the X-polarized component of the signal light of the second wavelength and the X-polarized component of the excitation light after the wavelength conversion. For example, the 90-degree rotation unit 40A inputs to the Y port 41B of the third PBS 39 the Y-polarized component of the signal light of the second wavelength and the Y-polarized component of the excitation light after the wavelength conversion.

The 90-degree rotation unit 40A rotates by 90 degrees the Y-polarized component of the signal light and the Y-polarized component of the excitation light that have been rotated by 45 degrees and input from the Y port 41B of the third PBS 39. For example, the 90-degree rotation unit 40A outputs to the wavelength conversion unit 41 the X-polarized component of the signal light and the X-polarized component of the excitation light. The wavelength conversion unit 41 multiplexes the X-polarized component of the signal light and the X-polarized component of the excitation light that have been rotated by 90 degrees and input from the 90-degree rotation unit 40A to perform the wavelength conversion to obtain the X-polarized component of the signal light and the X-polarized component of the excitation light in accordance with the X-polarized component of the excitation light. Then, the wavelength conversion unit 41 outputs from the X-port 41A the X-polarized component and the X-polarized component of the excitation light after the wavelength conversion.

The third PBS 39 multiplexes the X-polarized component of the signal light and the X-polarized component of the excitation light from the X port 41A and the Y-polarized component of the signal light and the Y-polarized component of the excitation light from the Y port 418. The 45-degree rotation unit 38 rotates by 45 degrees the X-polarized component of the signal light, the Y-polarized component of the signal light, the X-polarized component of the excitation light, and the Y-polarized component of the excitation light after the wavelength conversion input from the third PBS 39. For example, the 45-degree rotation unit 38 outputs the X-polarized and Y-polarized signal light and the Y-polarized excitation light after the wavelength conversion. The second PBS 37 splits the signal light and the excitation light after the wavelength conversion into the X-polarized signal light, the Y-polarized signal light, and the Y-polarized excitation light. The second PBS 37 outputs the X-polarized signal light to the first modulation unit 35 and outputs the Y-polarized signal light and the Y-polarized excitation light to the second modulation unit 36.

The second modulation unit 36 removes, in accordance with the control performed by the second modulation control unit 45A, the residual modulation components of the Y-polarized signal light and the Y-polarized excitation light after the wavelength conversion that have been returned. The first modulation unit 35 removes, in accordance with the control performed by the first modulation control unit 44, the residual modulation component of the X-polarized signal light after the wavelength conversion that have been returned. The first PBS 34 multiplexes the X-polarized signal light after the wavelength conversion input from the first modulation unit 35 and the Y-polarized signal light and the Y-polarized excitation light after the wavelength conversion input from the second modulation unit 36.

The second WDM coupler 42 splits the signal light and the excitation light after the wavelength conversion input from the first PBS 34 into the X-polarized and Y-polarized signal light after the wavelength conversion and the Y-polarized excitation light after the wavelength conversion. The second WDM coupler 42 outputs the X-polarized and Y-polarized signal light after the wavelength conversion to the signal light output unit 43 and outputs the excitation light after the wavelength conversion to the third WDM coupler 46. The third WDM coupler 46 outputs the Y-polarized excitation light after the wavelength conversion to the detection unit 47. The detection unit 47 detects the residual modulation component in the Y-polarized excitation light after the wavelength conversion.

The second modulation control unit 45A causes, in accordance with the detection result of the detection unit 47, for example, the residual modulation component of the Y-polarized excitation light, the frequency modulation to be performed so as to minimize the residual modulation components of the Y-polarized signal light and the Y-polarized excitation light after the wavelength conversion. As a result, the second modulation unit 36 may remove the residual modulation components from the Y-polarized signal light and the Y-polarized excitation light in the backward path, for example, from the X-polarized signal light and the X-polarized excitation light after the wavelength conversion. The first modulation control unit 44 stores the frequency modulation component in the forward path of the first modulation unit 35, thereby causing the residual modulation component to be removed in the backward path of the first modulation unit 35 in accordance with the frequency modulation component in the forward path.

Figure 13:
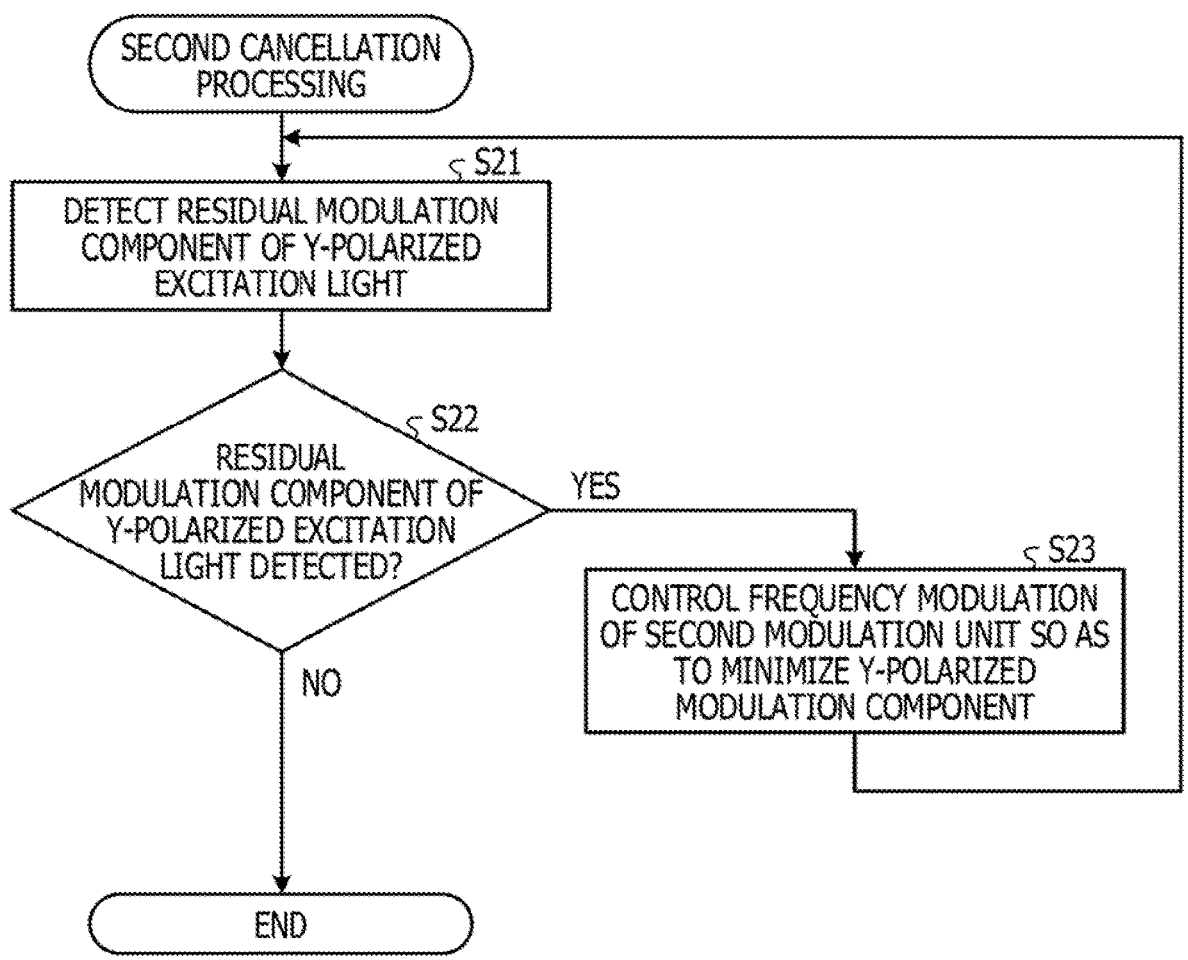
FIG. 13 is a flowchart illustrating an example of a processing operation of a wavelength conversion device related to second cancellation processing.

FIG. 13 is a flowchart illustrating an example of a processing operation of the wavelength conversion device 20 related to second cancellation processing. In FIG. 13, the detection unit 47 in the wavelength conversion device 20 performs the detection operation for the residual modulation component of the Y-polarized excitation light (step S21). The second modulation control unit 45A in the wavelength conversion device 20 determines whether the residual modulation component of the Y-polarized excitation light is detected (step S22). When the residual modulation component of the Y polarization is detected (Yes in step S22), the second modulation control unit 45A controls the frequency modulation performed by the second modulation unit 36 so as to minimize the residual modulation components of the Y-polarized signal light and the Y-polarized excitation light (step S23).

After controlling the frequency modulation performed by the second modulation unit 36, the second modulation control unit 45A moves to step S21 to perform the detection operation for the residual modulation component of the Y-polarized excitation light. When the residual modulation component of the Y-polarized excitation light is not detected (No in step S22), the second modulation control unit 45A ends the processing operation illustrated in FIG. 13.

The detection unit 47 according to the fourth embodiment detects the modulation component of the excitation light after the wavelength conversion output from the second modulation unit 36. In accordance with the modulation component in the excitation light after the wavelength conversion detected by the detection unit 47, the second modulation control unit 45A controls the second modulation unit 36 so as to minimize the modulation component in the Y-polarized signal light after the wavelength conversion. As a result, the modulation component of the Y-polarized signal light may be removed without monitoring the signal light.

In the case exemplified with the wavelength conversion device 20 according to the third and fourth embodiments, the residual modulation component of the excitation light of a single polarization after the wavelength conversion is detected, and, in accordance with the detection result, the first modulation unit 35 or the second modulation unit 36 is controlled so as to remove the residual modulation component of the signal light after the wavelength conversion that is in the same polarized state as a polarized state of the excitation light. However, this is not limiting, and an embodiment other than the above description will be described below as a fifth embodiment.

Fifth Embodiment

Figure 14:
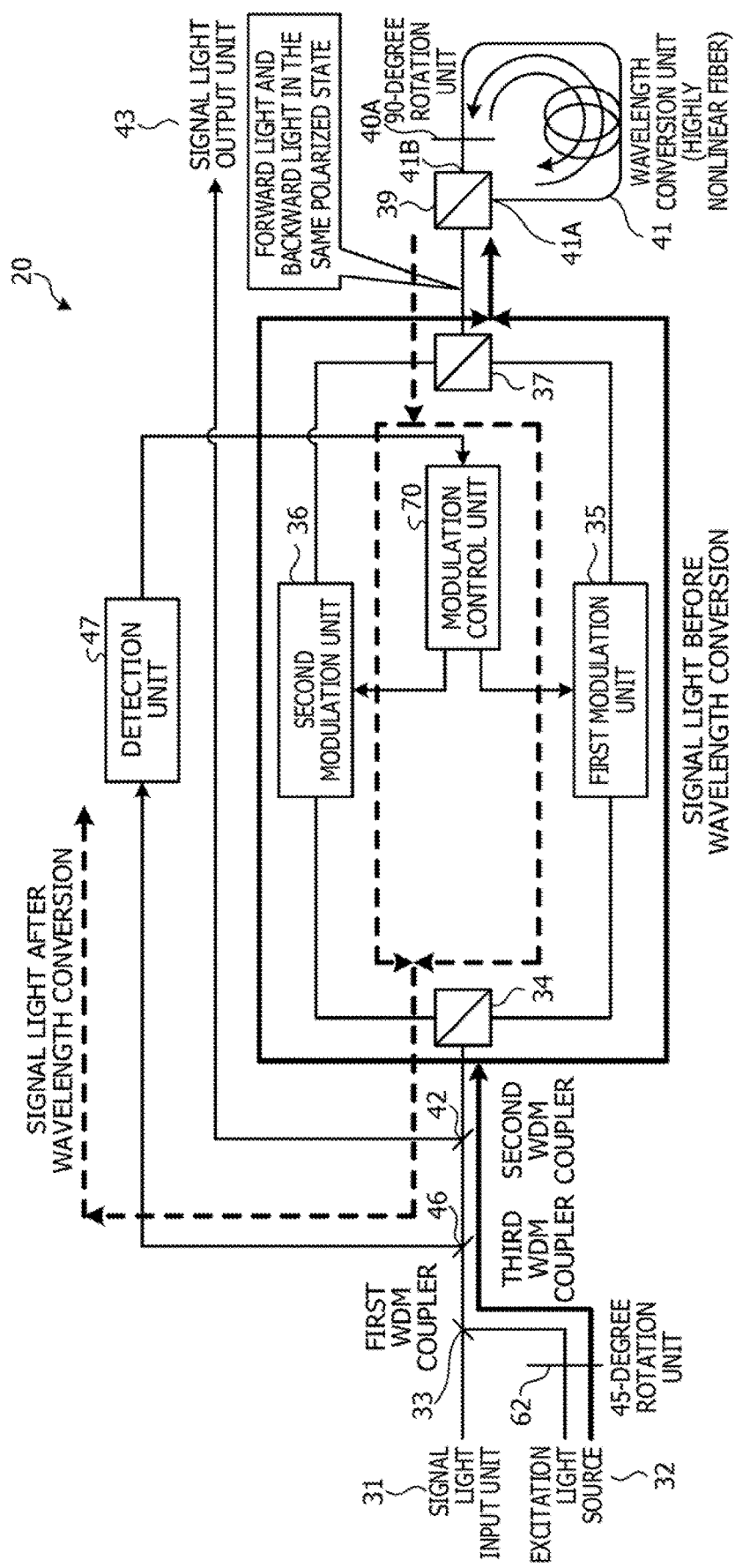
FIG. 14 is an explanatory view illustrating an example of a wavelength conversion device according to a fifth embodiment.

FIG. 14 is an explanatory view illustrating an example of the wavelength conversion device 20 according to the fifth embodiment. The same elements as those of the wavelength conversion device 20 according to the first embodiment are denoted by the same reference signs, thereby omitting the redundant description of the elements and operation. The wavelength conversion device 20 illustrated in FIG. 14 is different from the wavelength conversion device 20 illustrated in FIG. 2 in that a single modulation control unit 70 controls the first modulation unit 35 and the second modulation unit 36 in accordance with the residual modulation component of the excitation light after the wavelength conversion. The excitation light source 32 emits, for example, X-polarized excitation light. A 45-degree rotation unit 62 is disposed between the excitation light source 32 and the first WDM coupler 33. The 45-degree rotation unit 62 rotates the X-polarized excitation light input from the excitation light source 32 by 45 degrees to convert this X-polarized excitation light into the X-polarized component and a Y-polarized component of the excitation light. The third WDM coupler 46 is disposed between the first WDM coupler 33 and the second WDM coupler 42. The third WDM coupler 46 splits the excitation light after the wavelength conversion input from the first PBS 34. The detection unit 47 detects the modulation component of the excitation light split from the third WDM coupler 46.

The modulation control unit 70 controls the first modulation unit 35 to perform the frequency modulation in opposite phase that removes the residual modulation component in the backward path of the first modulation unit 35 in accordance with the detection result of the detection unit 47, for example, the residual modulation component of the X-polarized component of the excitation light after the wavelength conversion. The modulation control unit 70 controls the second modulation unit 36 to remove the residual modulation component in the backward path of the second modulation unit 36 in accordance with the detection result of the detection unit 47, for example, the residual modulation component of the Y-polarized component of the excitation light after the wavelength conversion.

Figure 15:
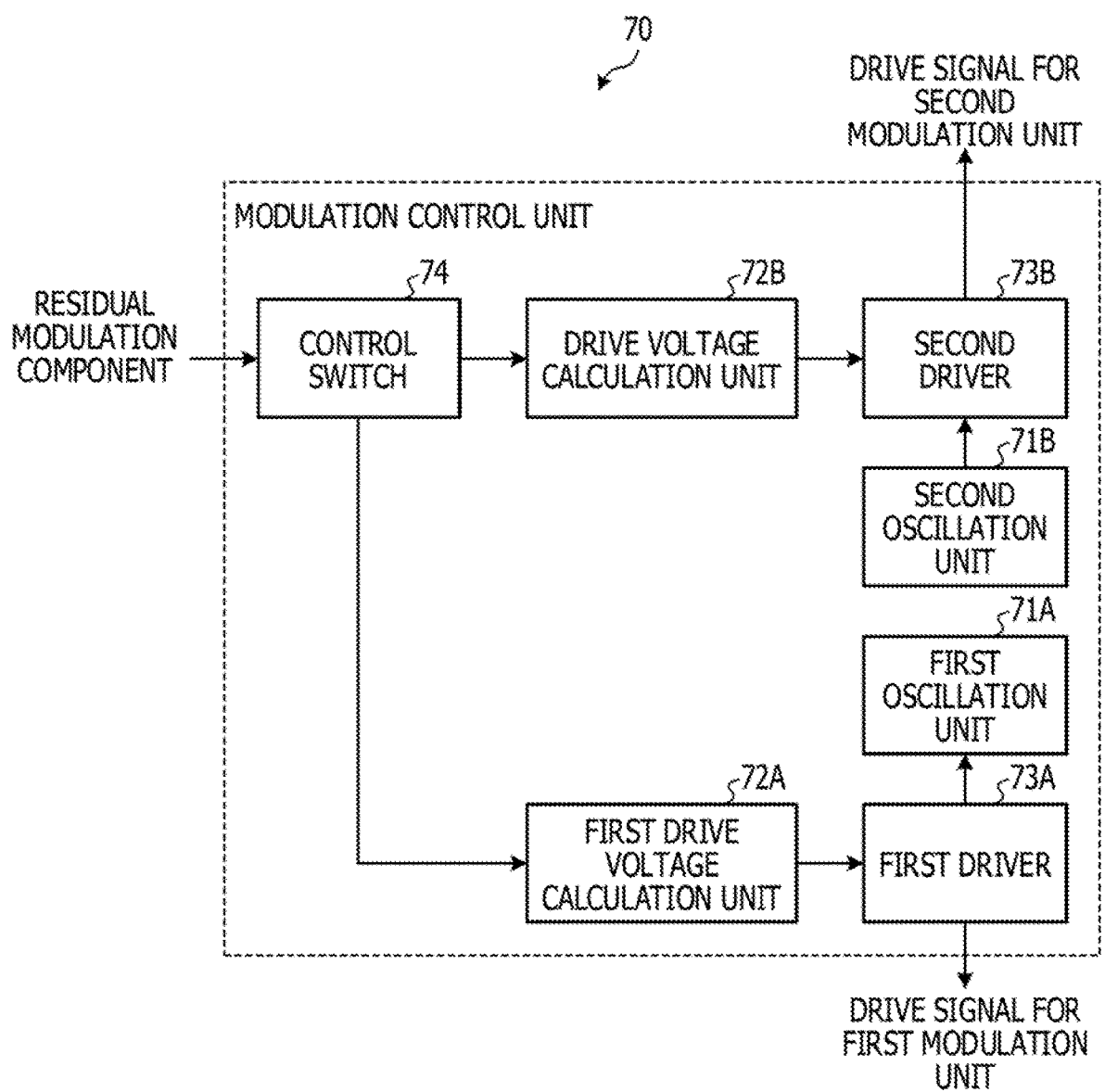
FIG. 15 is an explanatory view illustrating an example of a modulation control unit.

FIG. 15 is an explanatory view illustrating an example of the modulation control unit 70. The modulation control unit 70 illustrated in FIG. 15 includes a first oscillation unit 71A, a first drive voltage calculation unit 72A, a first driver 73A, a second oscillation unit 71B, a second drive voltage calculation unit 72B, a second driver 73B, and a control switch 74.

The first oscillation unit 71A generates oscillation of a frequency (sine wave). The first drive voltage calculation unit 72A calculates a drive voltage corresponding to the residual modulation component of the excitation light from the detection unit 47. The first drive voltage calculation unit 72A may refer to a table for controlling the drive voltage amount corresponding to the residual modulation component to obtain the drive voltage amount corresponding to the residual modulation component. The first driver 73A applies the drive voltage to the modulation frequency (sine wave) from the first oscillation unit 71A, thereby outputting a drive signal for controlling the first modulation unit 35. The modulation control unit 70 switches the control switch 74 to the first drive voltage calculation unit 72A side, thereby controlling the first modulation unit 35 to perform the frequency modulation on the X-polarized signal light and the X-polarized component of the excitation light in the forward path of the first modulation unit 35. The modulation control unit 70 controls the first modulation unit 35 to perform the frequency modulation that removes the residual modulation components in the X-polarized signal light and the X-polarized component of the excitation light in the backward path of the first modulation unit 35.

The second oscillation unit 71B generates oscillation of a frequency (sine wave). The second drive voltage calculation unit 72B calculates a drive voltage corresponding to the residual modulation component of the excitation light from the detection unit 47. The second drive voltage calculation unit 72B may refer to a table for controlling the drive voltage amount corresponding to the residual modulation component to obtain the drive voltage amount corresponding to the residual modulation component. The second driver 73B applies the drive voltage to the modulation frequency (sine wave) from the second oscillation unit 71B, thereby outputting a drive signal for controlling the second modulation unit 36. The modulation control unit 70 switches the control switch 74 to the second drive voltage calculation unit 72B side, thereby controlling the second modulation unit 36 to perform the frequency modulation on the Y-polarized signal light and the Y-polarized component of the excitation light in the forward path of the second modulation unit 36. The modulation control unit 70 controls the second modulation unit 36 to perform the frequency modulation that removes the residual modulation components in the Y-polarized signal light and the Y-polarized component of the excitation light in the backward path of the second modulation unit 36.

The control switch 74 switches output of the detection unit 47 that is input of the first drive voltage calculation unit 72A and the second drive voltage calculation unit 72B, for example, the residual modulation component of the excitation light at predetermined timing.

Next, operation of the wavelength conversion device 20 according to the fifth embodiment is described. The first WDM coupler 33 multiplexes the X-polarized signal light and the Y-polarized signal light input from the signal light input unit 31 and the X-polarized component and the Y-polarized component of the excitation light input from the 45-degree rotation unit 62. The first PBS 34 splits the signal light and the excitation light multiplexed by the first WDM coupler 33 into the X-polarized signal light and the X-polarized component of the excitation light and the Y-polarized signal light and the Y-polarized component of the excitation light. The first PBS 34 inputs the X-polarized signal light and the X-polarized component of the excitation light to the first modulation unit 35 and inputs the Y-polarized signal light and the Y-polarized component of the excitation light to the second modulation unit 36.

The first modulation unit 35 performs the frequency modulation on the X-polarized signal light and the X-polarized component of the excitation light and inputs the X-polarized signal light and the X-polarized component of the excitation light after the frequency modulation to the second PBS 37. The second modulation unit 36 performs the frequency modulation on the Y-polarized signal light and the Y-polarized component of the excitation light and inputs the Y-polarized signal light and the Y-polarized component of the excitation light after the frequency modulation to the second PBS 37. The second PBS 37 multiplexes the X-polarized signal light and the X-polarized component of the excitation light after the frequency modulation and the Y-polarized signal light and the Y-polarized component of the excitation light after the frequency modulation. The third PBS 39 splits the signal light and the excitation light after the frequency modulation input from the second PBS 37 into the X-polarized signal light and the X-polarized component of the excitation light after the frequency modulation and the Y-polarized signal light and the Y-polarized component of the excitation light after the frequency modulation. The third PBS 39 outputs from the X port 41A the X-polarized signal light and the X-polarized component of the excitation light after the frequency modulation and outputs from the Y port 41B the Y-polarized signal light and the Y-polarized component of the excitation light after the frequency modulation.

The wavelength conversion unit 41 multiplexes the X-polarized component of the signal light and the X-polarized component of the excitation light input from the X port 41A to perform the wavelength conversion to obtain the X-polarized component of the signal light of the second wavelength and the X-polarized component of the excitation light in accordance with the X-polarized component of the excitation light. The wavelength conversion unit 41 inputs the X-polarized signal light of the second wavelength and the X-polarized component of the excitation light after the wavelength conversion to the 90-degree rotation unit 40A. The 90-degree rotation unit 40A rotates by 90 degrees the X-polarized signal light of the second wavelength and the X-polarized component of the excitation light after the wavelength conversion. For example, the 90-degree rotation unit 40A outputs from the Y port 41B the Y-polarized signal light of the second wavelength and the Y-polarized component of the excitation light after the wavelength conversion.

The 90-degree rotation unit 40A in the wavelength conversion unit 41 rotates by 90 degrees the Y-polarized signal light and the Y-polarized component of the excitation light input from the Y port 41B. For example, the 90-degree rotation unit 40A inputs the X-polarized signal light and the X-polarized component of the excitation light to the wavelength conversion unit 41. The wavelength conversion unit 41 multiplexes the X-polarized signal light and the X-polarized component of the excitation light input from the 90-degree rotation unit 40A to perform the wavelength conversion to obtain the X-polarized signal light and the X-polarized component of the excitation light in accordance with the X-polarized component of the excitation light. The wavelength conversion unit 41 outputs from the X-port 41A the X-polarized signal light and the X-polarized component of the excitation light after the wavelength conversion.

The third PBS 39 multiplexes the X-polarized signal light and the X-polarized component of the excitation light from the X port 41A and the Y-polarized signal light and the Y-polarized component of the excitation light from the Y port 41B. The second PBS 37 splits, from the signal light and the excitation light input from the third PBS 39, the X-polarized signal light and the X-polarized component of the excitation light, and the Y-polarized signal light and the Y-polarized component of the excitation light. The second PBS 37 outputs the X-polarized signal light and the X-polarized component of the excitation light to the first modulation unit 35 and outputs the Y-polarized signal light and the Y-polarized component of the excitation light to the second modulation unit 36.

The first modulation unit 35 removes, in accordance with the control performed by the modulation control unit 70, the residual modulation components of the X-polarized signal light and the X-polarized component of the excitation light after the wavelength conversion and that have been returned. The second modulation unit 36 removes, in accordance with the control performed by the modulation control unit 70, the residual modulation components of the Y-polarized signal light and the Y-polarized component of the excitation light after the wavelength conversion and that have been returned. The first PBS 34 multiplexes the X-polarized signal light and the X-polarized component of the excitation light after the wavelength conversion input from the first modulation unit 35 and the Y-polarized signal light and the Y-polarized component of the excitation light after the wavelength conversion input from the second modulation unit 36.

The second WDM coupler 42 splits the signal light and the excitation light after the wavelength conversion input from the first PBS 34 into the X-polarized and Y-polarized signal light after the wavelength conversion and the X-polarized component and the Y-polarized component of the excitation light after the wavelength conversion. The second WDM coupler 42 outputs the X-polarized and Y-polarized signal light after the wavelength conversion to the signal light output unit 43 and outputs the X-polarized component and the Y-polarized component of the excitation light after the wavelength conversion to the third WDM coupler 46. The third WDM coupler 46 outputs the X-polarized component and the Y-polarized component of the excitation light after the wavelength conversion to the detection unit 47. The detection unit 47 detects the residual modulation component in the excitation light after the wavelength conversion.

The modulation control unit 70 controls the first modulation unit 35, in accordance with the detection result of the detection unit 47, for example, the residual modulation component of the X-polarized component of the excitation light, so that the first modulation unit 35 performs the frequency modulation so as to minimize the residual modulation components of the X-polarized signal light and the X-polarized component of the excitation light after the wavelength conversion. As a result, the first modulation unit 35 may remove the residual modulation components from the X-polarized signal light and the X-polarized component of the excitation light in the backward path, for example, from the X-polarized signal light and the X-polarized component of the excitation light after the wavelength conversion.

The modulation control unit 70 controls the second modulation unit 36, in accordance with the detection result of the detection unit 47, for example, the residual modulation component of the Y-polarized component of the excitation light, so that the second modulation unit 36 performs the frequency modulation so as to minimize the residual modulation components of the Y-polarized signal light and the Y-polarized component of the excitation light after the wavelength conversion. As a result, the second modulation unit 36 may remove the residual modulation components from the Y-polarized signal light and the Y-polarized component of the excitation light in the backward path, for example, from the Y-polarized signal light and the Y-polarized component of the excitation light after the wavelength conversion.

Figure 16:
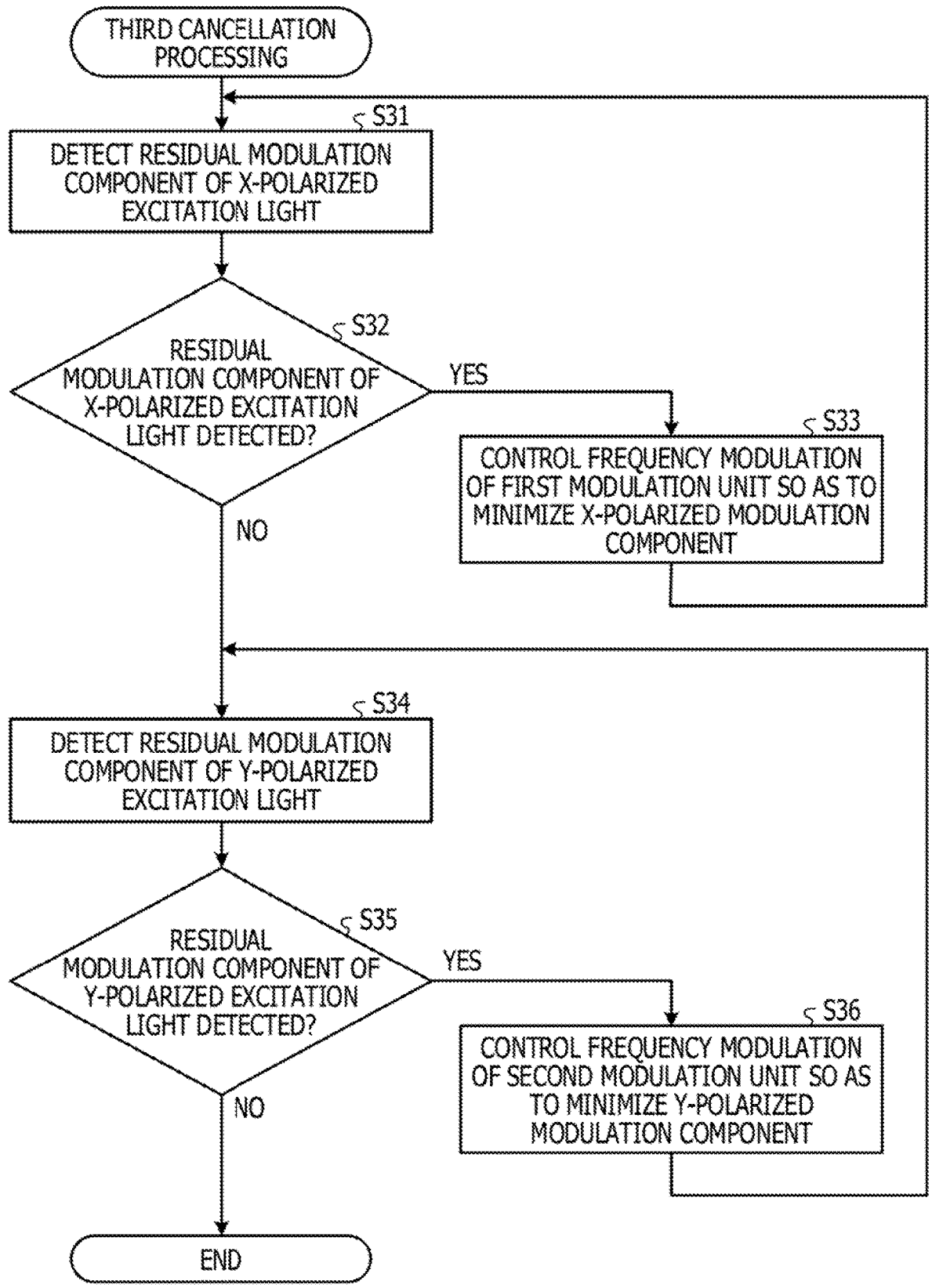
FIG. 16 is a flowchart illustrating an example of a processing operation of a wavelength conversion device related to third cancellation processing.

FIG. 16 is a flowchart illustrating an example of a processing operation of the wavelength conversion device 20 related to third cancellation processing. In FIG. 16, the detection unit 47 in the wavelength conversion device 20 performs a detection operation for the residual modulation component of the X-polarized component of the excitation light (step S31). The modulation control unit 70 in the wavelength conversion device 20 determines whether the residual modulation component of the X-polarized component of the excitation light is detected (step S32). When the residual modulation component of the X-polarized component of the excitation light is detected (Yes in step S32), the modulation control unit 70 controls the first modulation unit 35 so as to minimize the residual modulation components of the X-polarized signal light and the X-polarized component of the excitation light (step S33).

After controlling the first modulation unit 35 in step S33, the detection unit 47 moves to step S31 to perform the detection operation for the residual modulation component of the X-polarized component of the excitation light. When the residual modulation component of the X-polarized component of the excitation light is not detected (No in step S32), the detection unit 47 performs the detection operation for the residual modulation component of the Y-polarized component of the excitation light (step S34). The modulation control unit 70 determines whether the residual modulation component of the Y-polarized component of the excitation light is detected (step S35). When the residual modulation component of the Y-polarized component of the excitation light is detected (Yes in step S35), the modulation control unit 70 controls the second modulation unit 36 so as to minimize the residual modulation components of the Y-polarized signal light and the Y-polarized component of the excitation light (step S36). After controlling the second modulation unit 36, the modulation control unit 70 moves to step S34 to perform the detection operation for the residual modulation component of the Y-polarized component of the excitation light. When the residual modulation component of the Y-polarized component of the excitation light is not detected (No in step S35), the modulation control unit 70 ends the processing operation illustrated in FIG. 16.

The detection unit 47 according to the fifth embodiment detects the modulation component of the excitation light after the wavelength conversion output from the first modulation unit 35 and detects the modulation component of the excitation light after the wavelength conversion output from the second modulation unit 36. In accordance with the detection result of the detection unit 47, the modulation control unit 70 controls the first modulation unit 35 so as to minimize the modulation component in the X-polarized signal light after the wavelength conversion and controls the second modulation unit 36 so as to minimize the modulation component in the Y-polarized signal light after the wavelength conversion. As a result, the modulation components of the X-polarized signal light and Y-polarized signal light may be removed without monitoring the signal light.

Sixth Embodiment

Figure 17:
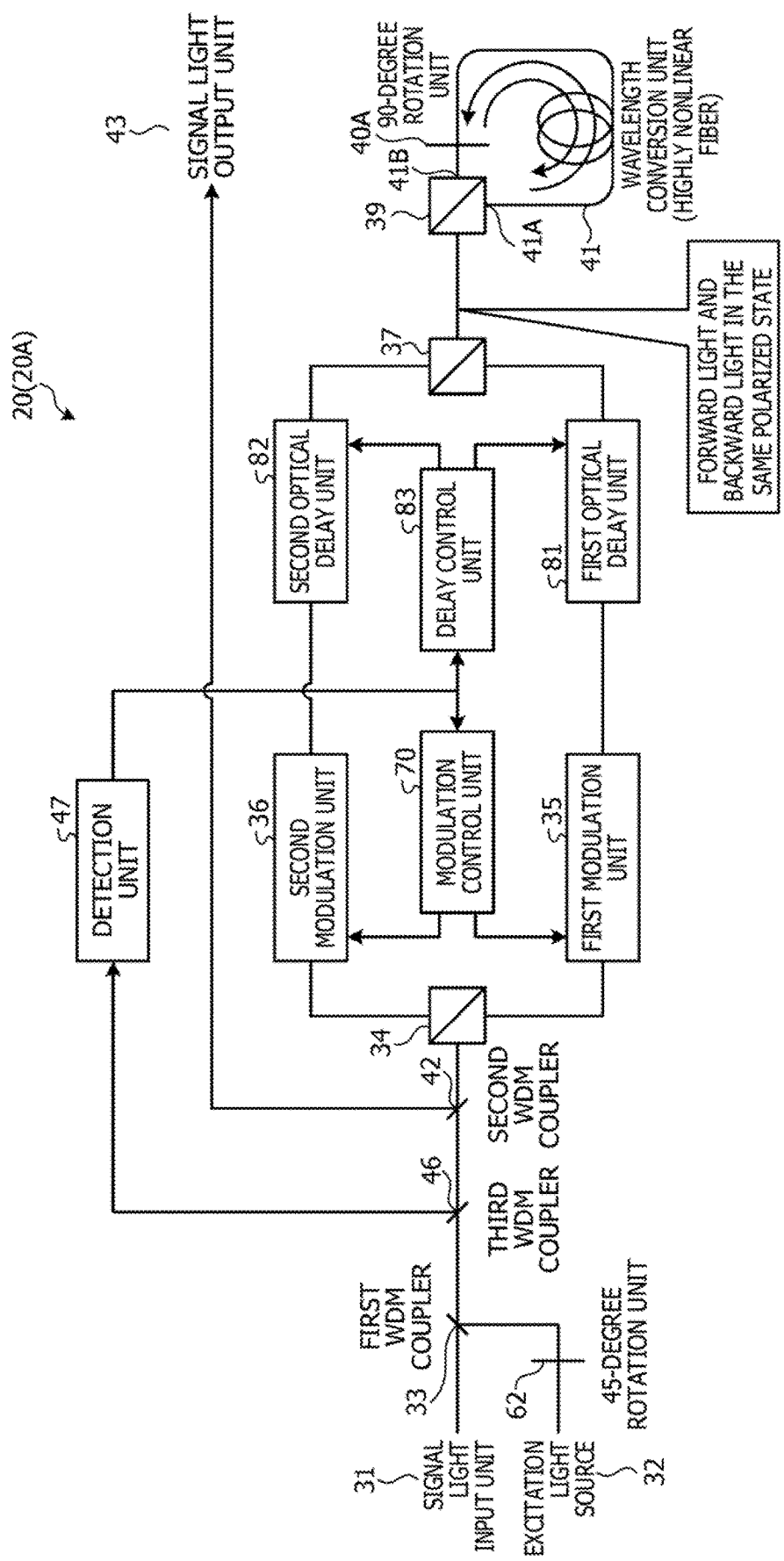
FIG. 17 is an explanatory view illustrating an example of a wavelength conversion device according to a sixth embodiment.

FIG. 17 is an explanatory view illustrating an example of the wavelength conversion device 20 according to a sixth embodiment. The same elements as those of the wavelength conversion device 20 according to the first embodiment are denoted by the same reference signs, thereby omitting the redundant description of the elements and operation. The wavelength conversion device 20 according to the sixth embodiment is different from the wavelength conversion device 20 according to the fifth embodiment in that the wavelength conversion device 20 according to the sixth embodiment includes a first optical delay unit 81, a second optical delay unit 82, and an optical delay control unit 83.

The first optical delay unit 81 is disposed between the first modulation unit 35 and the second PBS 37. The first optical delay unit 81 adjusts the first optical path length by which the X-polarized signal light after the wavelength conversion returns from the port on the wavelength conversion unit 41 side of the first modulation unit 35 by using a delay amount of a delay element such as a resistor in accordance with the wavelength of the X-polarized signal light after the modulation in the first modulation unit 35. The first optical path length is set to a distance corresponding to a wavelength half a wavelength shifted from an integral multiple of the wavelength of the X-polarized signal light after the modulation.

The second optical delay unit 82 is disposed between the second modulation unit 36 and the second PBS 37. The second optical delay unit 82 adjusts the second optical path length by which the Y-polarized signal light after the wavelength conversion returns from the port on the wavelength conversion unit 41 side of the second modulation unit 36 by using a delay amount of a delay element such as a resistor in accordance with the wavelength of the Y-polarized signal light after the modulation in the second modulation unit 36. The second optical path length is set to a distance corresponding to a wavelength half a wavelength shifted from an integral multiple of the wavelength of the Y-polarized signal light after the modulation. The optical delay control unit 83 controls the first optical delay unit 81 and the second optical delay unit 82.

Figure 18:
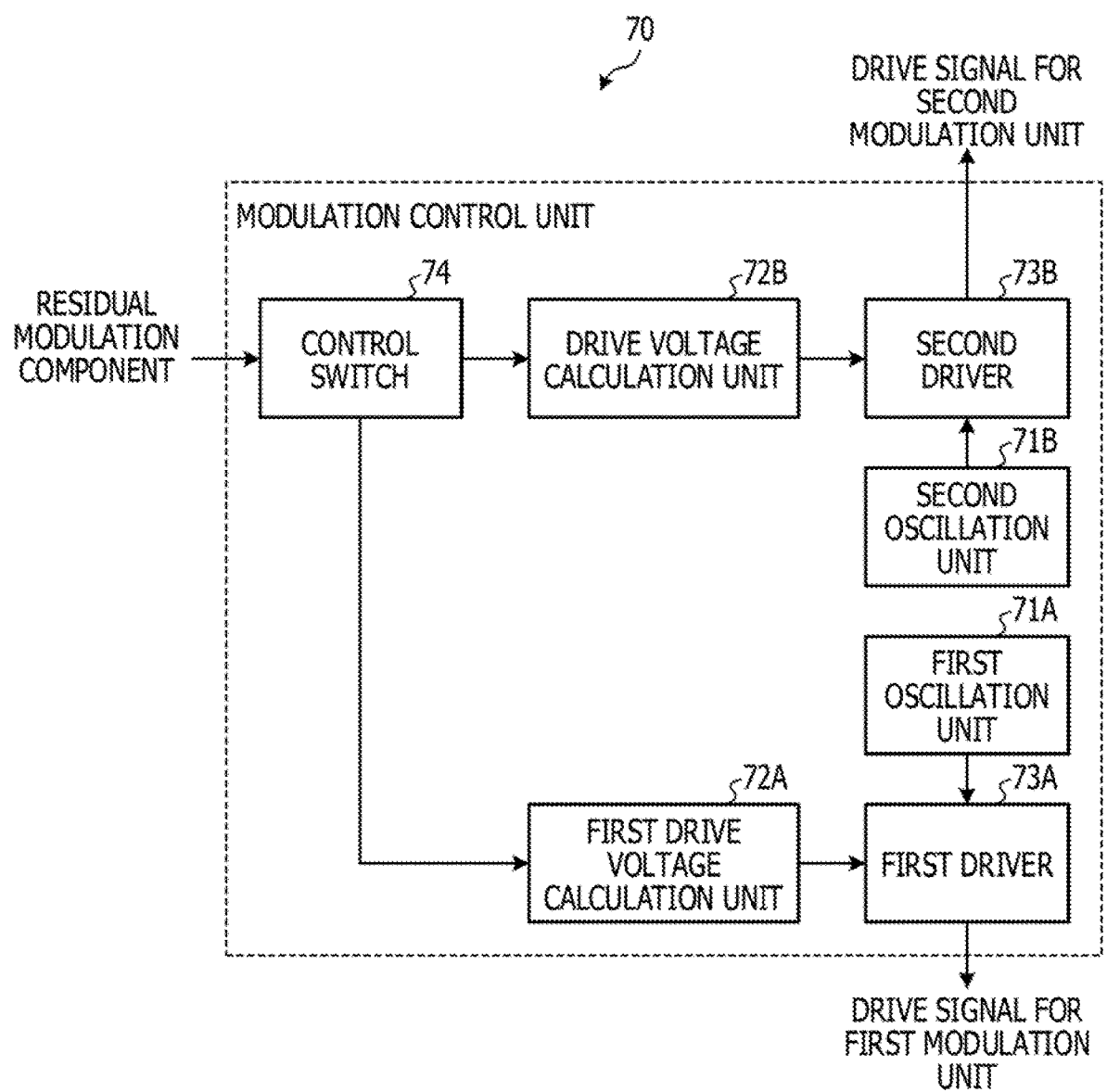
FIG. 18 is an explanatory view illustrating an example of a modulation control unit.

FIG. 18 is an explanatory view illustrating an example of the modulation control unit 70. The modulation control unit 70 illustrated in FIG. 18 includes the first oscillation unit 71A, the first drive voltage calculation unit 72A, the first driver 73A, the second oscillation unit 71B, the second drive voltage calculation unit 72B, the second driver 73B, and the control switch 74.

Figure 19:
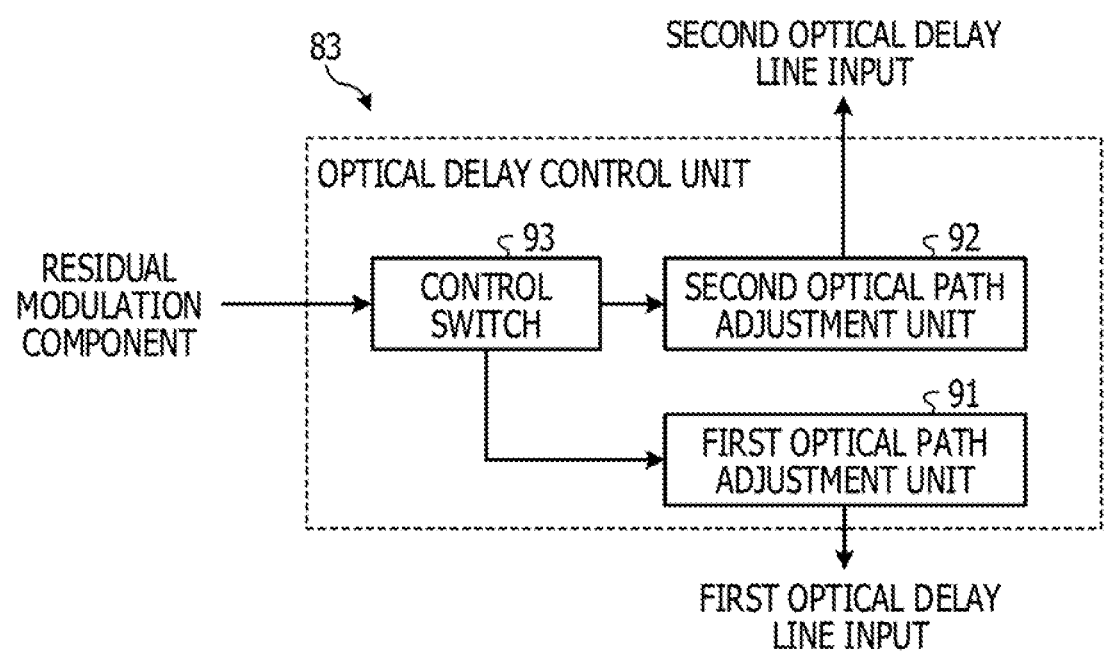
FIG. 19 is an explanatory view illustrating an example of an optical delay control unit.

FIG. 19 is an explanatory view illustrating an example of the optical delay control unit 83. The optical delay control unit 83 illustrated in FIG. 19 includes a first optical path adjustment unit 91, a second optical path adjustment unit 92, and a control switch 93. The first optical path adjustment unit 91 adjusts the first optical path length by using the delay element in the first optical delay unit 81. The second optical path adjustment unit 92 adjusts the second optical path length by using the delay element in the second optical delay unit 82. The control switch 93 switches between the first optical path adjustment unit 91 and the second optical path adjustment unit 92.

The first optical path adjustment unit 91 adjusts the first optical path length by using Expression 1 so that the first optical path length becomes a distance corresponding to a wavelength half a wavelength shifted from an integral multiple of the wavelength of the X-polarized signal light after the modulation. The second optical path adjustment unit 92 adjusts the second optical path length by using Expression 1 so that the second optical path length becomes a distance corresponding to a wavelength half a wavelength shifted from an integral multiple of the wavelength of the Y-polarized signal light after the modulation. With a shift only by the period of the modulation frequency plus a half the period, the frequency modulation may be performed in opposite phase in both the forward and backward paths.

$$1/f \times (n+\frac{1}{2}) - (L+\Delta L)/c$$

f: modulation frequency
n: integer
L: optical path length from output from the phase modulator to input to the phase modulator again
ΔL: adjustment amount due to optical delay line
C: speed of light The first optical path adjustment unit 91 calculates an adjustment amount ΔL of a first optical path length L by using Expression 1. The first optical path adjustment unit 91 refers to a table for controlling the delay amount of the first optical delay unit 81 corresponding to the adjustment amount ΔL to set the delay amount corresponding to the adjustment amount ΔL in the first optical delay unit 81. As a result, the first optical path length by which the X-polarized signal light after the wavelength conversion returns from the port on the wavelength conversion unit 41 side of the first modulation unit 35 becomes a distance corresponding to a wavelength half a wavelength shifted from an integral multiple of the wavelength of the X-polarized signal light after the modulation. Thus, the first modulation unit 35 may remove the modulation component before the wavelength conversion at timing of returning of the X-polarized signal light after the wavelength conversion.

The second optical path adjustment unit 92 calculates an adjustment amount ΔL of a second optical path length L by using Expression 1. The second optical path adjustment unit 92 refers to a table for controlling the delay amount of the second optical delay unit 82 corresponding to the adjustment amount ΔL to set the delay amount corresponding to the adjustment amount ΔL in the second optical delay unit 82. As a result, the second optical path length by which the Y-polarized signal light after the wavelength conversion returns from the port on the wavelength conversion unit 41 side of the second modulation unit 36 becomes a distance corresponding to a wavelength half a wavelength shifted from an integral multiple of the wavelength of the Y-polarized signal light after the modulation. Thus, the second modulation unit 36 may remove the modulation component before the wavelength conversion at timing of returning of the Y-polarized signal light after the wavelength conversion.

The first optical path adjustment unit 91 according to the sixth embodiment adjusts the first optical path length by using the delay amount corresponding to the wavelength of the X-polarized signal light after the modulation performed by the first modulation unit 35. The second optical path adjustment unit 92 adjusts the second optical path length by using the delay amount corresponding to the wavelength of the Y-polarized signal light after the modulation performed by the second modulation unit 36. As a result, the first optical path length becomes a distance corresponding to a wavelength half a wavelength shifted from an integral multiple of the wavelength of the X-polarized signal light after the modulation. Thus, the first modulation unit 35 may remove the modulation component before the wavelength conversion at the timing of returning of the X-polarized signal light after the wavelength conversion. The second optical path length becomes a distance corresponding to a wavelength half a wavelength shifted from an integral multiple of the wavelength of the X-polarized signal light after the modulation. Thus, the second modulation unit 36 may remove the modulation component before the wavelength conversion at the timing of returning of the Y-polarized signal light after the wavelength conversion.

Seventh Embodiment

Figure 20:
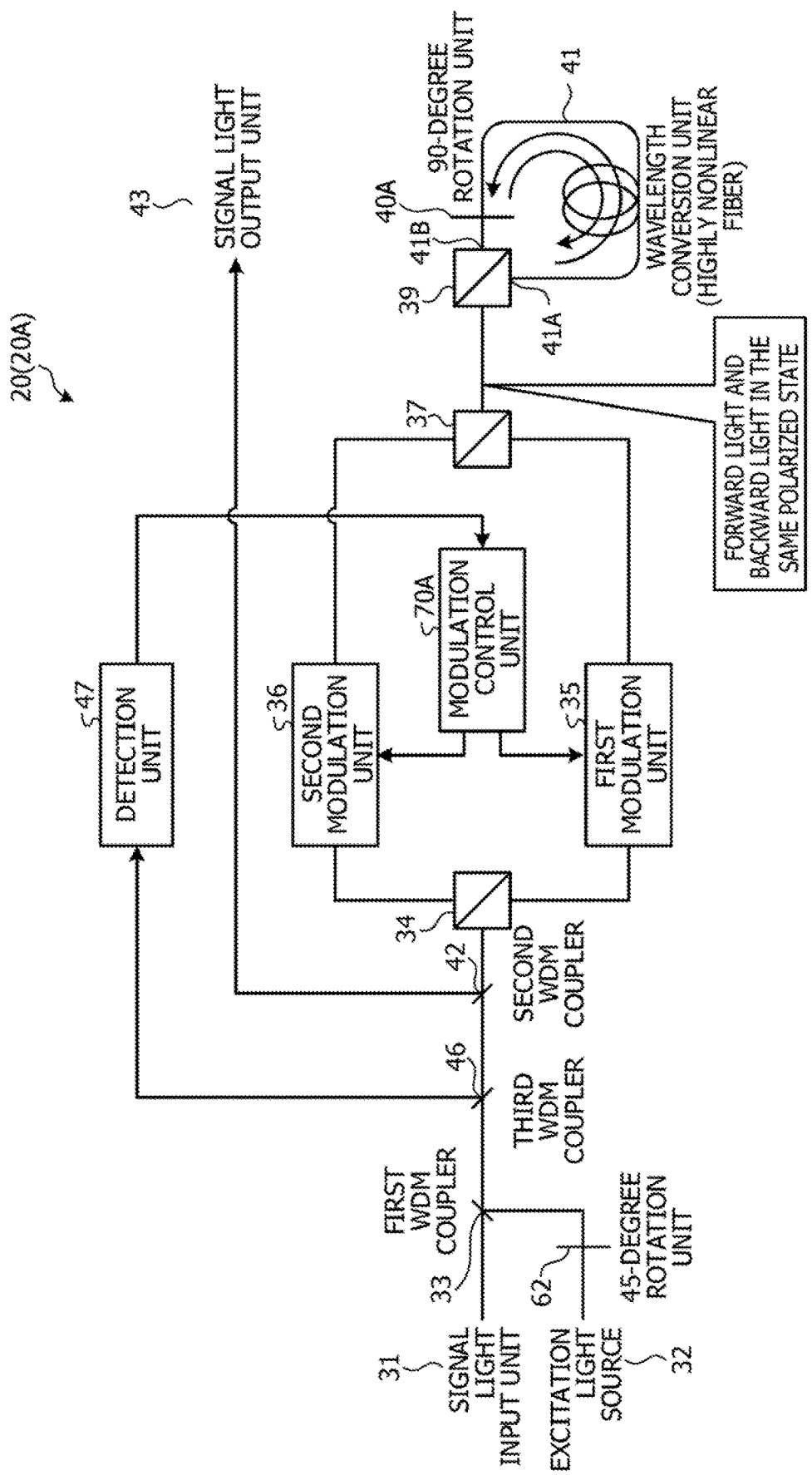
FIG. 20 is an explanatory view illustrating an example of a wavelength conversion device according to a seventh embodiment.

FIG. 20 is an explanatory view illustrating an example of the wavelength conversion device 20 according to a seventh embodiment. The same elements as those of the wavelength conversion device 20 according to the first embodiment are denoted by the same reference signs, thereby omitting the redundant description of the elements and operation. The wavelength conversion device 20 according to the seventh embodiment is different from the wavelength conversion device 20 according to the fifth embodiment in that the wavelength conversion device 20 according to the seventh embodiment includes a modulation control unit 70A that controls the first modulation unit 35 and the second modulation unit 36.

Figure 21:
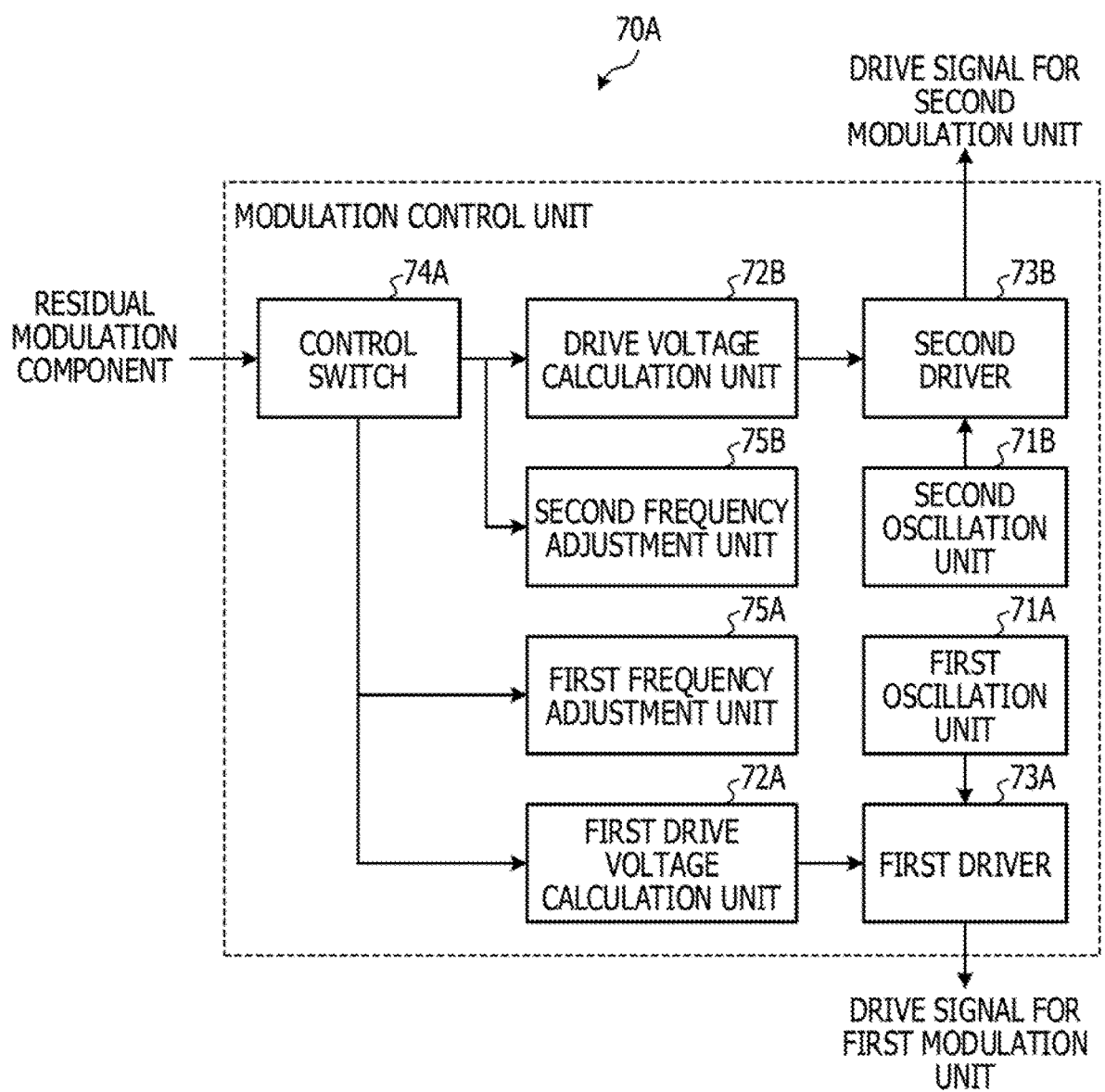
FIG. 21 is an explanatory view illustrating an example of a modulation control unit.

FIG. 21 is an explanatory view illustrating an example of the modulation control unit 70A. The modulation control unit 70A illustrated in FIG. 21 includes the first oscillation unit 71A, the first drive voltage calculation unit 72A, the first driver 73A, and a first frequency adjustment unit 75A. The modulation control unit 70A also includes the second oscillation unit 71B, the second drive voltage calculation unit 72B, the second driver 73B, a second frequency adjustment unit 75B, and a control switch 74A.

The first frequency adjustment unit 75A adjusts the first optical path length by which the X-polarized signal light after the wavelength conversion returns from the port on the wavelength conversion unit 41 side of the first modulation unit 35 by using a modulation frequency of the first modulation unit 35 in accordance with the wavelength of the X-polarized signal light after the modulation in the first modulation unit 35. The first optical path length is a distance corresponding to a wavelength half a wavelength shifted from an integral multiple of the wavelength of the X-polarzed signal light after the modulation. The second frequency adjustment unit 756 adjusts the second optical path length by which the Y-polarized signal light after the wavelength conversion returns from the port on the wavelength conversion unit 41 side of the second modulation unit 36 by using a modulation frequency of the second modulation unit 36 in accordance with the wavelength of the Y-polarized signal light after the modulation in the second modulation unit 36. The second optical path length is a distance corresponding to a wavelength half a wavelength shifted from an integral multiple of the wavelength of the Y-polarized signal light after the modulation. The control switch 74A switches between the first drive voltage calculation unit 72A/the first frequency adjustment unit 75A and the second drive voltage calculation unit 72B/the second frequency adjustment unit 75B.

The first frequency adjustment unit 75A adjusts the modulation frequency of the first modulation unit 35 on the first optical path length side by using Expression 2 so that the first optical path length becomes a distance corresponding to a wavelength half a wavelength shifted from an integral multiple of the wavelength of the X-polarized signal light after the modulation. Also, the second frequency adjustment unit 75B adjusts the modulation frequency of the second modulation unit 36 on the second optical path length side by using Expression 2 so that the second optical path length becomes a distance corresponding to a wavelength half a wavelength shifted from an integral multiple of the wavelength of the Y-polarized signal light after the modulation. With a shift only by the period of the modulation frequency plus a half the period, the frequency modulation is may be performed in opposite phase in both the forward and backward paths.

$$1/(f+\Delta f) \times (n+/2) = L/c$$

f: modulation frequency
Δf: adjustment amount of the modulation frequency
n: integer
L: optical path length from output from the phase modulator to input to the phase modulator again
C: speed of light The first frequency adjustment unit 75A calculates the adjustment amount Δf of the modulation frequency f on the first optical path length L side in Expression 2. The first frequency adjustment unit 75A sets the adjustment amount Δf in the first oscillation unit 71A. As a result, the first optical path length by which the X-polarized signal light after the wavelength conversion returns from the port on the wavelength conversion unit 41 side of the first modulation unit 35 becomes a distance corresponding to a wavelength half a wavelength shifted from an integral multiple of the wavelength of the X-polarized signal light after the modulation. Thus, the first modulation unit 35 may remove the modulation component before the wavelength conversion at the timing of returning of the X-polarized signal light after the wavelength conversion.

The second frequency adjustment unit 75B calculates the adjustment amount Δf of the modulation frequency f on the second optical path length L side in Expression 2. The second frequency adjustment unit 75B sets the adjustment amount f in the second oscillation unit 71B. As a result, the second optical path length by which the Y-polarized signal light after the wavelength conversion returns from the port on the wavelength conversion unit 41 side of the second modulation unit 36 becomes a distance corresponding to a wavelength half a wavelength shifted from an integral multiple of the wavelength of the Y-polarized signal light after the modulation. Thus, the second modulation unit 36 may remove the modulation component before the wavelength conversion at the timing of returning of the Y-polarized signal light after the wavelength conversion.

The first frequency adjustment unit 75A according to the seventh embodiment adjusts the first optical path length by using the modulation frequency of the first modulation unit 35 corresponding to the wavelength of the X-polarized signal light after the modulation performed by the first modulation unit 35. The second frequency adjustment unit 75B according to the seventh embodiment adjusts the second optical path length by using the modulation frequency of the second modulation unit 36 corresponding to the wavelength of the Y-polarized signal light after the modulation performed by the second modulation unit 36. As a result, the first optical path length becomes a distance corresponding to a wavelength half a wavelength shifted from an integral multiple of the wavelength of the X-polarized signal light after the modulation. Thus, the first modulation unit 35 may remove the modulation component before the wavelength conversion at the timing of returning of the X-polarized signal light after the wavelength conversion. The second optical path length becomes a distance corresponding to a wavelength half a wavelength shifted from an integral multiple of the wavelength of the X-polarized signal light after the modulation. Thus, the second modulation unit 36 may remove the modulation component before the wavelength conversion at the timing of returning of the Y-polarized signal light after the wavelength conversion.

In the case exemplified with the wavelength conversion device 20 according to the fifth embodiment, the first modulation unit 35 and the second modulation unit 36 are controlled by using the residual modulation components of the X-polarized component and the Y-polarized component of the excitation light after the wavelength conversion. However, instead of the excitation light after the wavelength conversion, the residual modulation component of the signal light after the wavelength conversion may be used. Which is to be used may be appropriately changed.

Eighth Embodiment

Figure 22:
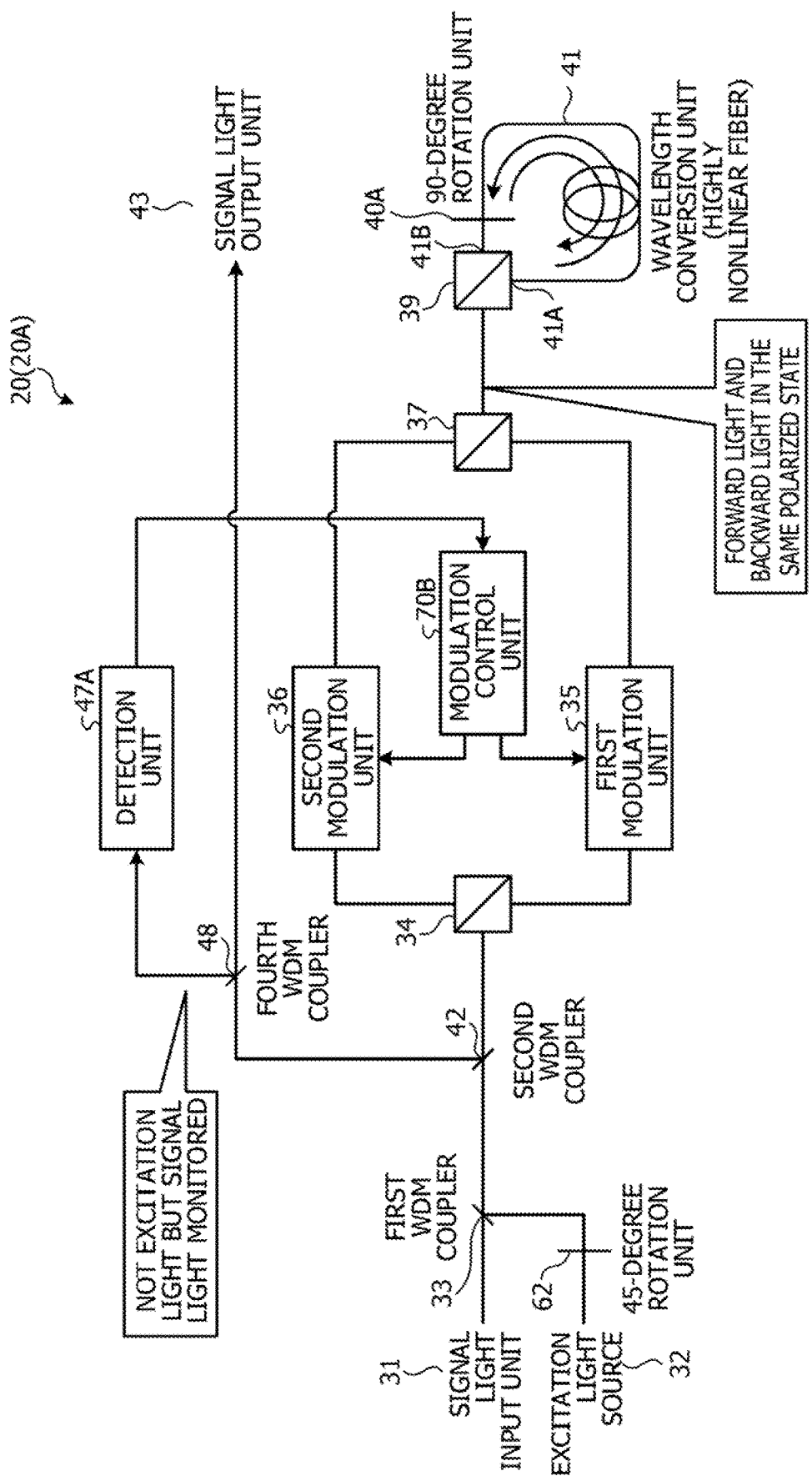
FIG. 22 is an explanatory view illustrating an example of a wavelength conversion device according to an eighth embodiment.

FIG. 22 is an explanatory view illustrating an example of the wavelength conversion device 20 according to an eighth embodiment. The same elements as those of the wavelength conversion device 20 according to the fifth embodiment are denoted by the same reference signs, thereby omitting the redundant description of the elements and operation. The wavelength conversion device 20 according to the eighth embodiment is different from the wavelength conversion device 20 according to the fifth embodiment in that the first modulation unit 35 and the second modulation unit 36 are controlled by using the residual modulation components of the signal light after the wavelength conversion instead of the residual modulation components of the excitation light after the wavelength conversion.

A fourth WDM coupler 48 that optically splits part of the signal light split by the second WDM coupler 42 is disposed between the second WDM coupler 42 and the signal light output unit 43. A detection unit 47A detects a residual modulation component from the part of the signal light split by the fourth WDM coupler 48.

A modulation control unit 70B controls the first modulation unit 35 to remove the residual modulation component in the backward path of the first modulation unit 35 in accordance with a detection result of the detection unit 47A, for example, the residual modulation component of the X-polarized signal light after the wavelength conversion. The modulation control unit 70B controls the second modulation unit 36 to remove the residual modulation component in the backward path of the second modulation unit 36 in accordance with the detection result of the detection unit 47A, for example, the residual modulation component of the Y-polarized signal light after the wavelength conversion.

Next, operation of the wavelength conversion device 20 according to the eighth embodiment is described. The first WDM coupler 33 multiplexes the X-polarized signal light and the Y-polarized signal light input from the signal light input unit 31 and the X-polarized component and the Y-polarized component of the excitation light input from the 45-degree rotation unit 62. The first PBS 34 splits the signal light and the excitation light multiplexed by the first WDM coupler 33 into the X-polarized signal light and the X-polarized component of the excitation light and the Y-polarized signal light and the Y-polarized component of the excitation light. The first PBS 34 inputs the X-polarized signal light and the X-polarized component of the excitation light to the first modulation unit 35 and inputs the Y-polarized signal light and the Y-polarized component of the excitation light to the second modulation unit 36.

The first modulation unit 35 performs the frequency modulation on the X-polarized signal light and the X-polarized component of the excitation light and inputs the X-polarized signal light and the X-polarized component of the excitation light after the frequency modulation to the second PBS 37. The second modulation unit 36 performs the frequency modulation on the Y-polarized signal light and the Y-polarized component of the excitation light and inputs the Y-polarized signal light and the Y-polarized component of the excitation light after the frequency modulation to the second PBS 37. The second PBS 37 multiplexes the X-polarized signal light and the X-polarized component of the excitation light after the frequency modulation and the Y-polarized signal light and the Y-polarized component of the excitation light after the frequency modulation. The third PBS 39 splits the signal light and the excitation light after the frequency modulation input from the second PBS 37 into the X-polarized signal light and the X-polarized component of the excitation light after the frequency modulation and the Y-polarized signal light and the Y-polarized component of the excitation light after the frequency modulation. The third PBS 39 outputs from the X port 41A the X-polarized signal light and the X-polarized component of the excitation light after the frequency modulation and outputs from the Y port 418 the Y-polarized signal light and the Y-polarized component of the excitation light after the frequency modulation.

The wavelength conversion unit 41 multiplexes the X-polarized component of the signal light and the X-polarized component of the excitation light from the X port 41A to perform the wavelength conversion to obtain the X-polarized component of the signal light of the second wavelength and the X-polarized component of the excitation light in accordance with the X-polarized component of the excitation light. The wavelength conversion unit 41 inputs the X-polarized signal light of the second wavelength and the X-polarized component of the excitation light after the wavelength conversion to the 90-degree rotation unit 40A. The 90-degree rotation unit 40A rotates by 90 degrees the X-polarized signal light of the second wavelength and the X-polarized component of the excitation light after the wavelength conversion. For example, the 90-degree rotation unit 40A inputs to the Y port 41B of the third PBS 39 the Y-polarized signal light of the second wavelength and the Y-polarized component of the excitation light after the wavelength conversion.

The 90-degree rotation unit 40A in the wavelength conversion unit 41 rotates by 90 degrees the Y-polarized signal light and the Y-polarized component of the excitation light from the Y port 418. For example, the 90-degree rotation unit 40A inputs the X-polarized signal light of the signal light and the X-polarized component of the excitation light to the wavelength conversion unit 41. The wavelength conversion unit 41 multiplexes the X-polarized signal light and the X-polarized component of the excitation light input from the 90-degree rotation unit 40A to perform the wavelength conversion to obtain the X-polarized signal light and the X-polarized component of the excitation light in accordance with the X-polarized component of the excitation light. The wavelength conversion unit 41 inputs the X-polarized signal light and the X-polarized component of the excitation light after the wavelength conversion to the X port 41A of the third PBS 39.

The third PBS 39 multiplexes the X-polarized signal light and the X-polarized component of the excitation light from the X port 41A and the Y-polarized signal light and the Y-polarized component of the excitation light from the Y port 418. The second PBS 37 splits, from the signal light and the excitation light input from the third PBS 39, the X-polarized signal light and the X-polarized component of the excitation light, and the Y-polarized signal light and the Y-polarized component of the excitation light. The third PBS 39 outputs the X-polarized signal light and the X-polarized component of the excitation light to the first modulation unit 35 and outputs the Y-polarized signal light and the Y-polarized component of the excitation light to the second modulation unit 36.

The first modulation unit 35 removes, in accordance with the control performed by the modulation control unit 708, the residual modulation components of the X-polarized signal light and the X-polarized component of the excitation light after the wavelength conversion and that have been returned. The second modulation unit 36 removes, in accordance with the control performed by the modulation control unit 70B, the residual modulation components of the Y-polarized signal light and the Y-polarized component of the excitation light after the wavelength conversion and that have been returned. The first PBS 34 multiplexes the X-polarized signal light and the X-polarized component of the excitation light after the wavelength conversion input from the first modulation unit 35 and the Y-polarized signal light and the Y-polarized component of the excitation light after the wavelength conversion input from the second modulation unit 36.

The second WDM coupler 42 splits the signal light and the excitation light after the wavelength conversion input from the first PBS 34 into the X-polarized and Y-polarized signal light after the wavelength conversion and the X-polarized component and the Y-polarized component of the excitation light after the wavelength conversion. The fourth WDM coupler 48 outputs to the detection unit 47A and the signal light output unit 43 the X-polarized signal light and the Y-polarized signal light after the wavelength conversion. The detection unit 47A detects the residual modulation component in the X-polarized signal light after the wavelength conversion and detects the residual modulation component in the Y-polarized signal light after the wavelength conversion.

The modulation control unit 70B causes, in accordance with the detection result of the detection unit 47A, for example, the residual modulation component of the X-polarized signal light, the frequency modulation to be performed so as to minimize the residual modulation components of the X-polarized signal light and the X-polarized component of the excitation light after the wavelength conversion. As a result, the first modulation unit 35 may remove the residual modulation components from the X-polarized signal light and the X-polarized component of the excitation light in the backward path, for example, from the X-polarized signal light and the X-polarized component of the excitation light after the wavelength conversion.

The modulation control unit 70B causes, in accordance with the detection result of the detection unit 47A, for example, the residual modulation component of the Y-polarized signal light, the frequency modulation to be performed so as to minimize the residual modulation components of the Y-polarized signal light and the Y-polarized component of the excitation light after the wavelength conversion. As a result, the second modulation unit 36 may remove the residual modulation components from the Y-polarized signal light and the Y-polarized component of the excitation light in the backward path, for example, from the Y-polarized signal light and the Y-polarized component of the excitation light after the wavelength conversion.

Figure 23:
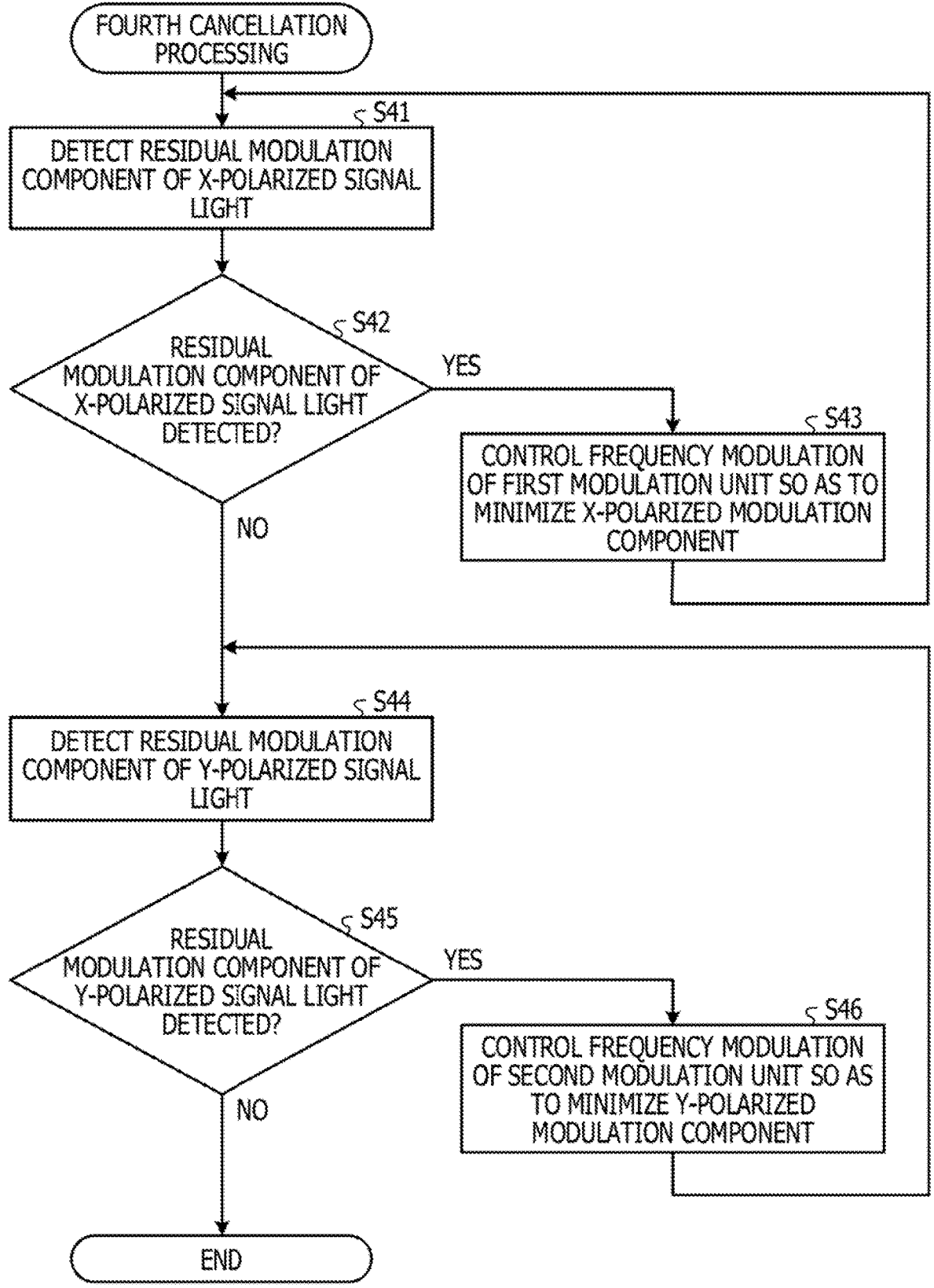
FIG. 23 is a flowchart illustrating an example of a processing operation of a wavelength conversion device related to fourth cancellation processing.

FIG. 23 is a flowchart illustrating an example of a processing operation of the wavelength conversion device 20 related to fourth cancellation processing. In FIG. 23, the detection unit 47A in the wavelength conversion device 20 performs a detection operation for the residual modulation component of the X-polarized signal light (step S41). The modulation control unit 70B in the wavelength conversion device 20 determines whether the residual modulation component of the X-polarized signal light is detected (step S42). When the residual modulation component of the X-polarized signal light is detected (Yes in step S42), the modulation control unit 70B controls the first modulation unit 35 so as to minimize the residual modulation component of the X-polarized signal light (step S43).

After controlling the first modulation unit 35 in step S43, the detection unit 47A moves to step S41 to perform the detection operation for the residual modulation component of the X-polarized signal light. When the residual modulation component of the X-polarized signal light is not detected (No in step S42), the detection unit 47A performs the detection operation for the residual modulation component of the Y-polarized signal light (step S44). The modulation control unit 70B determines whether the residual modulation component of the Y-polarized signal light is detected (step S45). When the residual modulation component of the Y-polarized signal light is detected (Yes in step S45), the modulation control unit 70B controls the second modulation unit 36 so as to minimize the residual modulation component of the Y-polarized signal light (step S46). After controlling the second modulation unit 36, the modulation control unit 70B moves to step S44 so as to perform the detection operation for the residual modulation component of the Y-polarized signal light. When the residual modulation component of the Y-polarized signal light is not detected (No in step S45), the modulation control unit 70B ends the processing operation illustrated in FIG. 23.

The detection unit 47A according to the eighth embodiment detects the modulation component in the X-polarized signal light after the wavelength conversion output from the first modulation unit 35. In accordance with the detection result of the detection unit 47A, the modulation control unit 70B controls the first modulation unit 35 so as to minimize the modulation component in the X-polarized signal light after the wavelength conversion. The detection unit 47A detects the modulation component in the Y-polarized signal light after the wavelength conversion output from the second modulation unit 36. In accordance with the detection result of the detection unit 47A, the modulation control unit 70B controls the second modulation unit 36 so as to minimize the modulation component in the Y-polarized signal light after the wavelength conversion. As a result, the modulation components of the X-polarized signal light and the Y-polarized signal light may be removed without monitoring the excitation light.

In the case exemplified with the wavelength conversion device 20 according to the embodiments herein, the modulation component is removed, in accordance with the detection result of the detection unit 47, from the second signal light after the wavelength conversion performed by the wavelength conversion unit 41. However, this technique may also be applied to the first wavelength conversion device 20A, the second wavelength conversion device 20B, the third wavelength conversion device 20C, and the fourth wavelength conversion device 20D. For example, with the first wavelength conversion device 20A, the modulation component is removed, in accordance with the detection result of the detection unit 47, from the second multiplexed light after the wavelength conversion performed by the wavelength conversion unit 41. With the second wavelength conversion device 20B, the modulation component is removed, in accordance with the detection result of the detection unit 47, from the third multiplexed light after the wavelength conversion performed by the wavelength conversion unit 41. With the third wavelength conversion device 20C and the fourth wavelength conversion device 20D, the modulation component is removed, in accordance with the detection result of the detection unit 47, from the first multiplexed light after the wavelength conversion performed by the wavelength conversion unit 41.

The embodiments herein are exemplified with, for example, the wavelength conversion device 20 that performs wavelength conversion on multiplexed light of the C-band to obtain multiplexed light of the L-band. However, the type of light is not limited to multiplexed light. The present embodiment may be applied to a wavelength conversion device that performs wavelength conversion on signal light of the C-band to obtain signal light of the L-band. The type of light may be appropriately changed. For convenience of description, the C-band is used as a reference. However, the present embodiment may be applied to a transmission system where wavelength conversion is performed between the L-band and S-band, for example, on the S-band to obtain the L-band or on the L-band to obtain the S-band. The type of the band of light may be appropriately changed.

In the WDM system 1 according to the above-described embodiments, the excitation light used for the wavelength conversion device 20 may be used for an optical component such as an optical amplifier. The component for which the excitation light is used may be appropriately changed.

The wavelength conversion device 20 converts the multiplexed light into an arbitrary wavelength band by propagating the multiplexed light and the excitation light through a non-linear fiber, and the excitation light of frequency modulation (FM, or phase modulation (PM)) may be used.

The above-described embodiments are exemplified with a system that uses optical components for the C-band and performs wavelength conversion on the multiplexed light of the C-band to obtain the multiplexed light of the S-band or L-band and transmit the obtained multiplexed light to the transmission path 3. However, the above-described embodiments may also be applied to a system that uses optical components for the S-band and performs wavelength conversion on multiplexed light of the S-band to obtain the multiplexed light of the C-band or L-band and transmit the obtained multiplexed light to the transmission path 3 or a system that uses optical components for the L-band and performs wavelength conversion on multiplexed light of the L-band to obtain the multiplexed light of the C-band or S-band and transmit the obtained multiplexed light to the transmission path 3.

Although the above-described embodiments are exemplified with the case of using the C-band, L-band, and S-band, the bands used are not limited to the C-band, L-band, or S-band. The above-described embodiments may be applied to, for example, an original band (O-band), an extended band (E-band), and an ultralong wavelength band (U-band). The bands for which the above-described embodiments are applied may be appropriately changed.

The wavelength conversion device 20 exemplifies the case where wavelength conversion is performed using single-wavelength excitation light. However, the excitation right used is not limited to the single-wavelength excitation light. The wavelength conversion may be performed using two-wavelength excitation light.

Although the wavelength conversion device 20 employs the degenerate four-wave mixing method as an example, this in not limiting and may be appropriately changed.

In the case exemplified with the first modulation unit 35 and the second modulation unit 36, the signal light undergoes the frequency modulation. However, the signal light may undergo phase modulation. The type of modulation that the signal light undergoes may be appropriately changed.

The elements of the components illustrated are not necessarily physically configured as illustrated in the drawings. For example, a particular form of separation and integration of each component is not limited to the form illustrated in the drawings, and all or part thereof may be configured by being separated or integrated functionally or physically in any units depending on various loads, usage states, and the like.

Ninth Example

Figure 24:
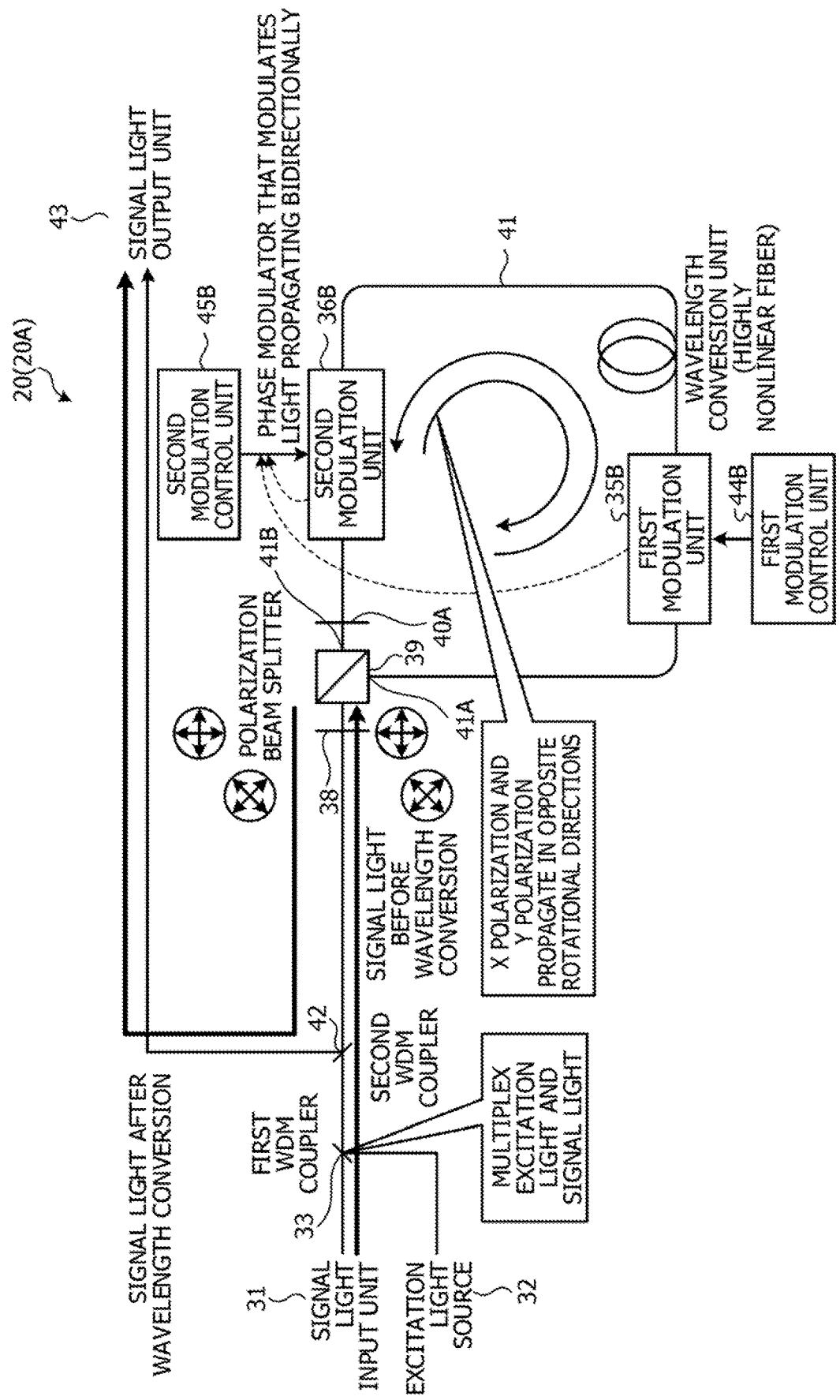
FIG. 24 is an explanatory view illustrating an example of a wavelength conversion device according to a ninth embodiment.

FIG. 24 is an explanatory view illustrating an example of the wavelength conversion device 20 according to a ninth embodiment. For convenience of description, for example, the first wavelength conversion device 20A is described as the example for description of the wavelength conversion device 20 illustrated in FIG. 24. The first wavelength conversion device 20A illustrated in FIG. 24 includes the signal light input unit 31, the excitation light source 32, and the first WDM coupler 33. The first wavelength conversion device 20A also includes the 45-degree rotation unit 38, the third PBS 39, the 90-degree rotation unit 40A, a first modulation unit 35B, a second modulation unit 36B, the wavelength conversion unit 41, the second WDM coupler 42, the signal light output unit 43, a first modulation control unit 448, and a second modulation control unit 45B.

The signal light input unit 31 inputs X-polarized and Y-polarized signal light. The excitation light source 32 emits excitation light of a single polarization, for example, X-polarized excitation light. The first WDM coupler 33 multiplexes the X-polarized and Y-polarized signal light from the signal light input unit 31 and the X-polarized excitation light from the excitation light source 32.

The 45-degree rotation unit 38 rotates input light from one direction by 45 degrees and rotates input light from the other direction by 45 degrees. The third PBS 39 splits input light from one direction into X polarization and Y polarization and multiplexes X-polarized input light and Y-polarized input light from the other direction. The third PBS 39 includes the X port 41A and the Y port 41B in the other direction and inputs X-polarized input light to the X port 41A and Y-polarized input light to the Y port 41B. The 90-degree rotation unit 40A rotates input light from one direction by 90 degrees and rotates input light from the other direction by 90 degrees. The first modulation unit 356 is a bidirectional phase modulator that performs frequency modulation on input light from one direction (port on the third PBS 39 side) and performs frequency modulation on input light from the other direction. The second modulation unit 36B performs the frequency modulation on input light from one direction (port on the third PBS 39 side) and performs the frequency modulation on input light from the other direction. The first modulation unit 35 performs the frequency modulation on the input light from the other direction so as to minimize the modulation component generated by modulating the input light from the one direction by the second modulation unit 368. The second modulation unit 36B performs the frequency modulation on the input light from the other direction so as to minimize the modulation component generated by modulating the input light from the one direction by the first modulation unit 35B. Signal light and excitation light in input light from one direction (X port 41A) propagate through the wavelength conversion unit 41 and undergo wavelength conversion into signal light of a different wavelength in accordance with the excitation light. Signal light and excitation light in input light from the other direction (Y port 41B) propagate through the wavelength conversion unit 41 and undergo wavelength conversion into signal light of a different wavelength in accordance with the excitation light. The wavelength conversion unit 41 includes, for example, an HNLF or the like through which light propagates bidirectionally. The second WDM coupler 42 outputs to the signal light output unit 43 the signal light after the wavelength conversion from the input light. The first modulation control unit 448 controls the first modulation unit 35B. The second modulation control unit 458 controls the second modulation unit 36 B.

An optical path length from output from a port on the opposite side to the third PBS 39 existing in the first modulation unit 35B to input of the signal light after the wavelength conversion to a port on the opposite side to the third PBS 39 existing in the second modulation unit 36B is set to a distance corresponding to a wavelength half a wavelength shifted from an integral multiple of the wavelength of the signal light after the modulation. At this time, an optical path length from output from the port on the opposite side to the third PBS 39 existing in the second modulation unit 36B to input of the signal light after the wavelength conversion to the port on the opposite side to the third PBS 39 existing in the first modulation unit 35B is also set to a distance corresponding to a wavelength half a wavelength shifted from an integral multiple of the wavelength of the signal light after the modulation.

FIG. 4 is an explanatory view illustrating examples of the signal light after the modulation and before the wavelength conversion, the excitation light after the modulation, and the signal light after the modulation and the wavelength conversion. The wavelength conversion unit 41 allows the X-polarized signal light and the X-polarized excitation light after the frequency modulation performed by the first modulation unit 35B to propagate therethrough and performs the wavelength conversion on the X-polarized signal light after the frequency modulation to obtain the X-polarized signal light of a different wavelength (output signal light) in accordance with the excitation light after the frequency modulation. The wavelength of the output signal light also fluctuates in accordance with the frequency modulation. Also, the wavelength conversion unit 41 allows the Y-polarized signal light and the Y-polarized excitation light after the frequency modulation performed by the second modulation unit 36B to propagate therethrough and performs the wavelength conversion on the Y-polarized signal light after the frequency modulation to obtain the Y-polarized signal light of a different wavelength (output signal light) in accordance with the excitation light after the frequency modulation. The wavelength of the output signal light also fluctuates in accordance with the frequency modulation. The X-polarized signal light that has passed through the first modulation unit 35B before the wavelength conversion undergoes the wavelength conversion performed by the wavelength conversion unit (HNLF), and then propagates through the second modulation unit 36B. The Y-polarized signal light that has passed through the second modulation unit 36B before the wavelength conversion undergoes the wavelength conversion performed by the wavelength conversion unit (HNLF), and then propagates through the first modulation unit 35B. Thus, the first modulation unit 35B may remove the modulation component from the Y-polarized signal light after the wavelength conversion by performing on the Y-polarized signal light after the wavelength conversion the frequency modulation in opposite phase to the frequency modulation before the wavelength conversion. The second modulation unit 36B may remove the modulation component from the X-polarized signal light after the wavelength conversion by performing on the X-polarized signal light after the wavelength conversion the frequency modulation in opposite phase to the frequency modulation before the wavelength conversion.

Next, operation of the wavelength conversion device 20 according to the ninth embodiment is described. The first WDM coupler 33 multiplexes the X-polarized and Y-polarized signal light from the signal light input unit 31 and the X-polarized excitation light from the excitation light source 32 and outputs the signal light and excitation light that have been multiplexed to the 45-degree rotation unit 38.

The 45-degree rotation unit 38 rotates by 45 degrees the X-polarized and Y-polarized signal light and the X-polarized excitation light that have been multiplexed. The 45-degree rotation unit 38 outputs to the third PBS 39 the signal light and the excitation light that have been rotated by 45 degrees.

The third PBS 39 extracts the following components from the signal light and the excitation light that have been rotated by 45 degrees from the 45-degree rotation unit 38: the X-polarized component of the X-polarized signal light that has been rotated by 45 degrees; the X-polarized component of the Y-polarized signal light that has been rotated by 45 degrees; and the X-polarized component of the X-polarized excitation light that has been rotated by 45 degrees. The third PBS 39 synthesizes, for example, the following signal light and the excitation light of the Y-polarized components: the X-polarized component of the X-polarized signal light that has been rotated by 45 degrees; the X-polarized component of the Y-polarized signal light that has been rotated by 45 degrees, and the X-polarized component of the X-polarized excitation light that has been rotated by 45 degrees. The third PBS 39 outputs from the X port 41A to the first modulation unit 35B the X-polarized component of the signal light of a first wavelength and the X-polarized component of the excitation light that have been synthesized.

The first modulation unit 35B performs the frequency modulation on the X-polarized signal light and the X-polarized excitation light. As a result, the SBS component of the X-polarized signal light after the wavelength conversion is suppressed by the frequency modulation. The first modulation unit 35B outputs to the wavelength conversion unit 41 the X-polarized signal light and the X-polarized excitation light after the frequency modulation.

The wavelength conversion unit 41 allows the following components input from the first modulation unit 35B to propagate in the same direction: the X-polarized component of the X-polarized signal light that has been rotated by 45 degrees; the X-polarized component of the Y-polarized signal light that has been rotated by 45 degrees; and the X-polarized component of the X-polarized excitation light that has been rotated by 45 degrees. The wavelength conversion unit 41 performs the wavelength conversion on the X-polarized component of the signal light of the first wavelength to obtain the X-polarized component of the signal light of a second wavelength in accordance with the X-polarized component of the excitation light. The wavelength conversion unit 41 inputs the X-polarized component of the signal light of the second wavelength after the wavelength conversion to the second modulation unit 36B.

The second modulation unit 36B performs the frequency modulation so as to minimize the modulation component in the X-polarized signal light of the second wavelength output from the wavelength conversion unit 41. The second modulation unit 36B removes from the X-polarized signal light of the second wavelength after the wavelength conversion the modulation component generated by the frequency modulation performed on the X-polarized signal light of the first wavelength before the wavelength conversion. For example, the second modulation unit 36B removes the modulation component from the X-polarized signal light after the wavelength conversion by using a modulation component the amount of which is the same as and the phase of which is opposite to the modulation component generated by the frequency modulation performed on the X-polarized signal light before the wavelength conversion. The second modulation unit 36B inputs to the 90-degree rotation unit 40A the X-polarized signal light of the second wavelength from which the modulation component has been removed.

The 90-degree rotation unit 40A rotates the X-polarized component of the signal light of the second wavelength by 90 degrees to input the Y-polarized component of the signal light of the second wavelength to the Y port 41B of the third PBS 39.

The third PBS 39 extracts the following components from the signal light and the excitation light that have been rotated by 45 degrees from the 45-degree rotation unit 38: the Y-polarized component of the X-polarized signal light that has been rotated by 45 degrees; the Y-polarized component of the Y-polarized signal light that has been rotated by 45 degrees; and the Y-polarized component of the X-polarized excitation light that has been rotated by 45 degrees. The third PBS 39 synthesizes, for example, the following signal light and the excitation light of the Y-polarized components: the Y-polarized component of the X-polarized signal light that has been rotated by 45 degrees; the Y-polarized component of the Y-polarized signal light that has been rotated by 45 degrees, and the Y-polarized component of the X-polarized excitation light that has been rotated by 45 degrees. The third PBS 39 outputs from the Y port 41B to the 90-degree rotation unit 40A the Y-polarized component of the signal light of the first wavelength and the Y-polarized component of the excitation light that have been synthesized.

The 90-degree rotation unit 40A rotates by 90 degrees the Y-polarized component of the signal light of the first wavelength and the Y-polarized component of the excitation light from the Y port 41B of the third PBS 39 to input to the second modulation unit 36B the X-polarized component of the signal light of the first wavelength and the X-polarized component of the excitation light.

The second modulation unit 36B performs the frequency modulation on the X-polarized signal light. As a result, the SBS component of the X-polarized signal light after the wavelength conversion is suppressed by the frequency modulation. The second modulation unit 36B outputs to the wavelength conversion unit 41 the X-polarized signal light after the frequency modulation.

The wavelength conversion unit 41 multiplexes the X-polarized component of the signal light of the first wavelength and the X-polarized component of the excitation light input from the second modulation unit 36B and performs wavelength conversion to obtain the X-polarized component of the signal light of the second wavelength in accordance with the X-polarized component of the excitation light. The wavelength conversion unit 41 inputs the X-polarized component of the signal light of the second wavelength after the wavelength conversion to the first modulation unit 35B.

The first modulation unit 35B performs the frequency modulation so as to minimize the modulation component in the X-polarized signal light of the second wavelength output from the wavelength conversion unit 41. The first modulation unit 35B removes from the X-polarized signal light of the second wavelength after the wavelength conversion the modulation component generated by the frequency modulation performed on the X-polarized signal light of the first wavelength before the wavelength conversion. For example, the first modulation unit 35B removes the modulation component from the X-polarized signal light after the wavelength conversion by using a modulation component the amount of which is the same as and the phase of which is opposite to the modulation component generated by the frequency modulation performed on the X-polarized signal light before the wavelength conversion. The first modulation unit 35B inputs to the X port 41A of the third PBS 39 the X-polarized signal light of the second wavelength from which the modulation component has been removed.

The third PBS 39 multiplexes the Y-polarized component of the signal light of the second wavelength after the wavelength conversion from the Y port 41B and the X-polarized component of the signal light of the second wavelength after the wavelength conversion from the X port 41A. The third PBS 39 inputs to the 45-degree rotation unit 38 the X-polarized component and the Y-polarized component of the signal light of the second wavelength that have been multiplexed. The 45-degree rotation unit 38 rotates by 45 degrees the X-polarized component and the Y-polarized component of the signal light of the second wavelength, from the third PBS 39, that have been multiplexed. The 45-degree rotation unit 38 inputs the X-polarized component and the Y-polarized component of the signal light of the second wavelength that have been rotated by 45 degrees to the second WDM coupler 42. The second WDM coupler 42 outputs to the signal light output unit 43 polarization multiplexed signal light including the X-polarized signal light of the second wavelength and the Y-polarized signal light of the second wavelength that have been rotated by 45 degrees.

The first modulation unit 35B according to the ninth embodiment modulates the X-polarized signal light before the wavelength conversion to output the X-polarized signal light after the modulation to the wavelength conversion unit 41 and minimizes the modulation component in the Y-polarized signal light after the wavelength conversion modulated by the second modulation unit 36B to output. The second modulation unit 36B modulates the Y-polarized signal light before the wavelength conversion to output the modulated Y-polarized signal light to the wavelength conversion unit 41 and minimizes the modulation component in the X-polarized signal light after the wavelength conversion modulated by the first modulation unit 35B to output. For example, the SBS components of the X-polarized and Y-polarized signal light (polarization multiplexed signal light) are suppressed, and the modulation components are removed from the X-polarized and Y-polarized signal light (polarization multiplexed signal light). As a result, degradation of the signal characteristics of the polarization multiplexed signal light after the wavelength conversion may be suppressed. Compared to the related art, the configuration may be simplified by reducing the numbers of modulation units and drivers, and the power consumption of the drivers may be reduced as is the case with the first embodiment. In addition, since the wavelength conversion device may be configured with a smaller number of the PBSs than that of the first embodiment, the configuration may be simplified compared to the first embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength conversion device comprising:
   a wavelength converter configured to multiplex signal light of first polarization and excitation light to perform wavelength conversion to obtain the signal light of the first polarization of a different wavelength in accordance with the excitation light and configured to multiplex signal light of second polarization, which is perpendicular to the first polarization, and the excitation light to perform wavelength conversion to obtain the signal light of the second polarization of a different wavelength in accordance with the excitation light;
   a first modulator configured to modulate the signal light of the first polarization before the wavelength conversion to output the signal light of the first polarization that has been modulated and reduce a modulation component in signal light after wavelength conversion to output the signal light after the wavelength conversion;
   a second modulator configured to modulate the signal light of the second polarization before the wavelength conversion to output the signal light of the second polarization that has been modulated and reduce the modulation component in the signal light after the wavelength conversion to output the signal light after the wavelength conversion; and
   a multiplexer configured to multiplex the signal light of the first polarization after the wavelength conversion output from the first modulator and the signal light of the second polarization after the wavelength conversion output from the second modulator, thereby to output a polarization multiplexed signal.

2. The wavelength conversion device according to claim 1, wherein
the first modulator modulates the signal light of the first polarization before the wavelength conversion to output the signal light of the first polarization that has been modulated to the wavelength converter and reduces a modulation component in the signal light of the first polarization after the wave length conversion returned from the wavelength converter to output the signal light of the first polarization after the wavelength conversion, and wherein
the second modulator modulates the signal light of the second polarization before the wavelength conversion to output the signal light of the second polarization that has been modulated to the wavelength converter and reduces a modulation component in the signal light of the second polarization after the wave length conversion returned from the wavelength converter to output the signal light of the second polarization after the wavelength conversion.

3. The wavelength conversion device according to claim 1, wherein
the first modulator modulates the signal light of the first polarization before the wavelength conversion to output the signal light of the first polarization that has been modulated and reduces a modulation component in the signal light of the second polarization after the wavelength conversion to output the signal light of the second polarization after the wavelength conversion, and wherein
the second modulator modulates the signal light of the second polarization before the wavelength conversion to output the signal light of the second polarization that has been modulated and reduces a modulation component in the signal light of the first polarization after the wave length conversion to output the signal light of the first polarization after the wavelength conversion.

4. The wavelength conversion device according to claim 1, wherein
one modulator out of the first modulator and the second modulator modulates the excitation light before the wavelength conversion to output the excitation light that has been modulated and reduces a modulation component in the excitation light after the wavelength conversion to output the excitation light after the wavelength conversion, and wherein
the wavelength conversion device includes a detector configured to detect the modulation component of the excitation light after the wavelength conversion output from the one modulator.

5. The wavelength conversion device according to claim 4, further comprising:
a control circuit configured to control the one modulator so as to reduce the modulation component in the signal light after the wavelength conversion in accordance with the modulation component in the excitation light after the wavelength conversion detected by the detector.

6. The wavelength conversion device according to claim 1, wherein
each of the first modulator and the second modulator modulates the excitation light before the wavelength conversion to output the excitation light that has been modulated and reduces a modulation component in the excitation light after the wavelength conversion to output the excitation light after the wavelength conversion, and wherein
the wavelength conversion device includes
a detector configured to detect the modulation component of the excitation light after the wavelength conversion output from the first modulator and detect the modulation component of the excitation light after the wavelength conversion output from the second modulator,
a control circuit configured to control the first modulator so as to reduce a modulation component in the signal light of the first polarization after the wavelength conversion in accordance with a detection result of the detector and control the second modulator so as to reduce a modulation component in the signal light of the second polarization after the wavelength conversion in accordance with a detection result of the detector.

7. The wavelength conversion device according to claim 1, wherein
the first modulator modulates the excitation light a polarized state of which is rotated before the wavelength conversion by 45 degrees to output the excitation light that has been modulated to the wavelength converter, wherein
the wavelength converter multiplexes the excitation light that has been modulated and rotated by 45 degrees and the signal light of the first polarization that has been modulated to perform the wavelength conversion to obtain the signal light of the first polarization of a different wavelength and the excitation light in accordance with the excitation light that has been rotated by 45 degrees, wherein
the first modulator reduces a modulation component in the signal light of the first polarization and a modulation component in the excitation light after the wavelength conversion returned from the wavelength converter, wherein
the second modulator modulates the excitation light the polarized state of which is rotated before the wavelength conversion by 45 degrees to output the excitation light that has been modulated to the wavelength converter, wherein
the wavelength converter multiplexes the excitation light that has been modulated and rotated by 45 degrees and the signal light of the second polarization that has been modulated to perform the wavelength conversion to obtain the signal light of the second polarization of a different wavelength and the excitation light in accordance with the excitation light that has been rotated by 45 degrees, wherein
the second modulator reduces a modulation component in the signal light of the second polarization and a modulation component in the excitation light after the wavelength conversion returned from the wavelength converter, and wherein
the wavelength conversion device includes
a detector configured to detect the modulation component in the excitation light after the wavelength conversion output from the first modulator and the modulation component in the excitation light after the wavelength conversion output from the second modulator, and
a control circuit configured to control the first modulator and the second modulator so as to reduce the modulation component in the signal light of the first polarization or the modulation component in the signal light of the second polarization in accordance with a detection result of the detector.

8. The wavelength conversion device according to claim 1, further comprising:
a detector configured to detect a modulation component in the signal light of the first polarization after the wavelength conversion output from the first modulator; and
a control circuit configured to control the first modulator so as to reduce the modulation component in the signal light of the first polarization after the wavelength conversion in accordance with a detection result of the detector.

9. The wavelength conversion device according to claim 1, wherein
a first optical path length by which the signal light of the first polarization after the wavelength conversion returns from a port on a wavelength converter side of the first modulator is set to a distance that corresponds to a wavelength half a wavelength shifted from an integral multiple of a wavelength of the signal light of the first polarization that has been modulated, and wherein
a second optical path length by which the signal light of the second polarization after the wavelength conversion returns from a port on a wavelength converter side of the second modulator is set to a distance that corresponds to a wavelength half a wavelength shifted from an integral multiple of a wavelength of the signal light of the second polarization that has been modulated.

10. The wavelength conversion device according to claim 9, further comprising:
a first optical delay line configured to adjust the first optical path length with a delay amount that corresponds to the wavelength of the signal light of the first polarization that has been modulated by the first modulator; and
a second optical delay line configured to adjust the second optical path length with a delay amount that corresponds to the wavelength of the signal light of the second polarization that has been modulated by the second modulator.

11. The wavelength conversion device according to claim 9, further comprising:
a first frequency adjustment circuit configured to adjust the first optical path length with a modulation frequency of the first modulator that corresponds to the wavelength of the signal light of the first polarization that has been modulated by the first modulator; and
a second frequency adjustment circuit configured to adjust the second optical path length with a modulation frequency of the second modulator that corresponds to the wavelength of the signal light of the second polarization that has been modulated by the second modulator.

12. A method of performing wavelength conversion, the method comprising:
multiplexing signal light of first polarization and excitation light to perform wavelength conversion to obtain the signal light of the first polarization of a different wavelength in accordance with the excitation light, and multiplexing signal light of second polarization, which is perpendicular to the first polarization, and the excitation light to perform wavelength conversion to obtain the signal light of the second polarization of a different wavelength in accordance with the excitation light;
modulating the signal light of the first polarization before the wavelength conversion to output the signal light of the first polarization that has been modulated, and reducing a modulation component in signal light after wavelength conversion to output the signal light after the wavelength conversion;
modulating the signal light of the second polarization before the wavelength conversion to output the signal light of the second polarization that has been modulated, and reducing the modulation component in the signal light after the wavelength conversion to output the signal light after the wavelength conversion; and
multiplexing the signal light of the first polarization after the wavelength conversion that has been output and the signal light of the second polarization after the wavelength conversion that has been output, thereby outputting a polarization multiplexed signal.

\* \* \* \* \*